(12) United States Patent
Matsuda et al.

(10) Patent No.: US 11,212,423 B2
(45) Date of Patent: Dec. 28, 2021

(54) VIDEO DEVICE

(71) Applicant: Hitachi, Ltd., Tokyo (JP)

(72) Inventors: Takahiro Matsuda, Tokyo (JP);
Yoshiho Seo, Tokyo (JP); Satoshi Ouchi, Tokyo (JP); Shinsuke Onoe, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 60 days.

(21) Appl. No.: 16/627,914

(22) PCT Filed: Jun. 1, 2018

(86) PCT No.: PCT/JP2018/021256
§ 371 (c)(1),
(2) Date: Dec. 31, 2019

(87) PCT Pub. No.: WO2019/064700
PCT Pub. Date: Apr. 4, 2019

(65) Prior Publication Data
US 2021/0168264 A1    Jun. 3, 2021

(30) Foreign Application Priority Data

Sep. 28, 2017 (JP) .............................. JP2017-187572

(51) Int. Cl.
*H04N 3/02* (2006.01)
*G02B 26/10* (2006.01)
(Continued)

(52) U.S. Cl.
CPC ............. *H04N 3/02* (2013.01); *G02B 26/103* (2013.01); *H04N 5/04* (2013.01); *H04N 5/2256* (2013.01); *H04N 5/76* (2013.01); *H04N 9/3135* (2013.01)

(58) Field of Classification Search
CPC .......... H04N 3/02; H04N 5/04; H04N 5/2256; H04N 5/76; H04N 9/3135; G02B 26/103; G02B 26/10
See application file for complete search history.

(56) References Cited

U.S. PATENT DOCUMENTS

2008/0265178 A1   10/2008   Johnston
2009/0015894 A1   1/2009   Rosman et al.
(Continued)

FOREIGN PATENT DOCUMENTS

JP   2008-116922 A   5/2008
JP   2013-244045 A   12/2013
(Continued)

OTHER PUBLICATIONS

International Search Report (PCT/ISA/210) issued in PCT Application No. PCT/JP2018/021256 dated Aug. 21, 2018 with English translation (four (4) pages).
(Continued)

*Primary Examiner* — Michael E Teitelbaum
(74) *Attorney, Agent, or Firm* — Crowell & Moring LLP

(57) ABSTRACT

To propose an optical scanning method for a video device including an optical scanning unit in which one end of a light guide path has a protruding beam-shaped structure. The video device includes the optical scanning unit having the light guide path in which light enters from one end and emits from the other end, and a vibration unit configured to apply vibration to the light guide path via a joint unit in a vicinity of the other end of the light guide path; a drive signal generation unit that generates a drive signal for inducing vibration in the vibration unit; and a scanning trajectory control unit which has a function of independently vibrating the light guide path in a first direction substantially perpendicular to an optical axis direction of the light guide path, and in a second direction substantially perpendicular to the
(Continued)

optical axis direction of the light guide path and substantially perpendicular to the first direction by the vibration unit, and which generates a first drive signal configured to drive the vibration unit in the first direction and a second drive signal configured to drive the vibration unit in the second direction with any pattern. The scanning trajectory control unit generates the first drive signal and the second drive signal as sine waves having different phases and a substantially same frequency, and sets a modulation amount of an amplitude modulation of a sine wave of the second drive signal to be larger than a modulation amount of an amplitude modulation of a sine wave of the first drive signal.

5 Claims, 39 Drawing Sheets

(51) Int. Cl.
*H04N 5/04* (2006.01)
*H04N 5/225* (2006.01)
*H04N 5/76* (2006.01)
*H04N 9/31* (2006.01)

(56) References Cited

U.S. PATENT DOCUMENTS

| | | | |
|---|---|---|---|
| 2009/0316116 A1* | 12/2009 | Melville | A61B 1/07 |
| | | | 353/31 |
| 2017/0041577 A1 | 2/2017 | Nishimura | |
| 2017/0318181 A1 | 11/2017 | Nishimura | |

FOREIGN PATENT DOCUMENTS

| | | |
|---|---|---|
| JP | 2014-147462 A | 8/2014 |
| JP | 2015-206981 A | 11/2015 |
| WO | WO 2016/116963 | 7/2016 |

OTHER PUBLICATIONS

Japanese-language Written Opinion (PCT/ISA/237) issued in PCT Application No. PCT/JP2018/021256 dated Aug. 21, 2018 (four (4) pages).

* cited by examiner

[FIG. 1]
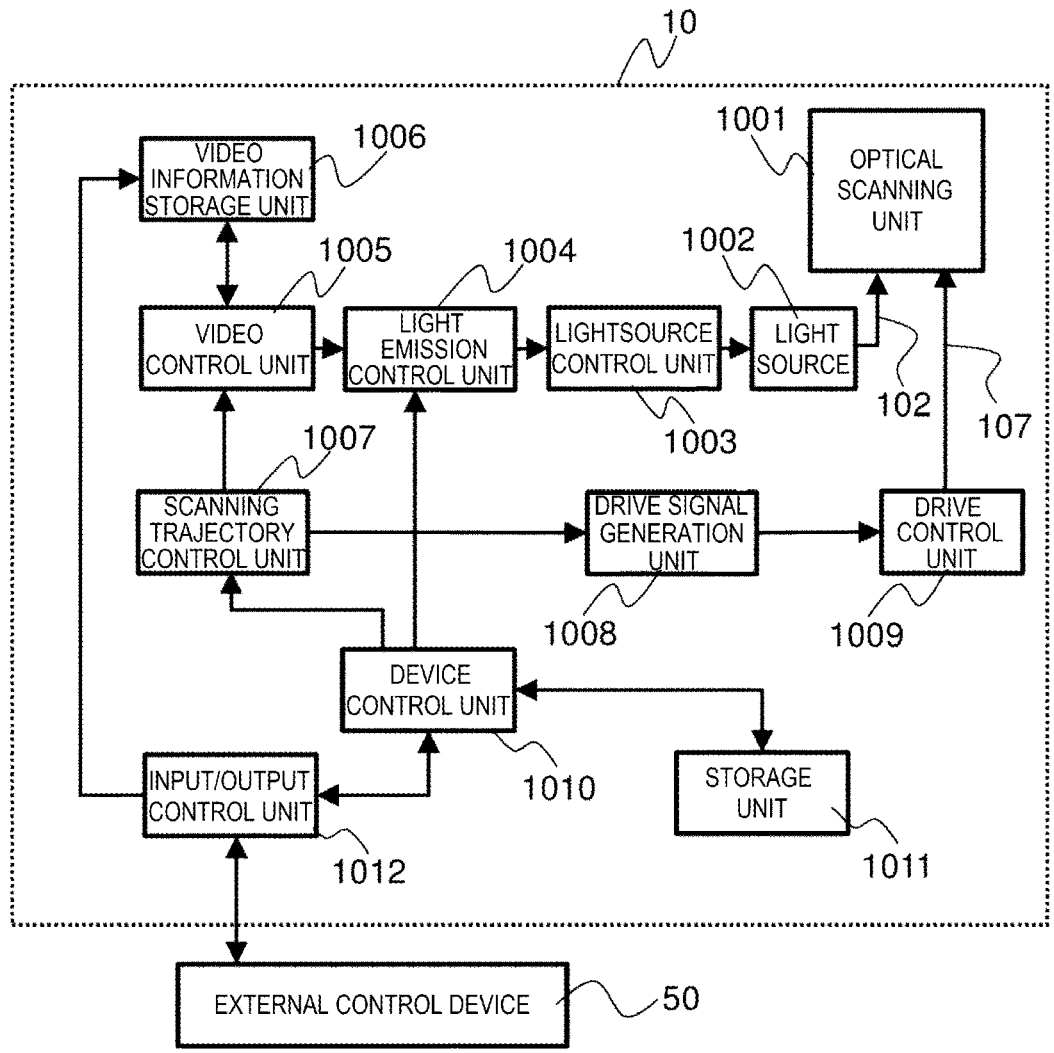
[FIG. 2]
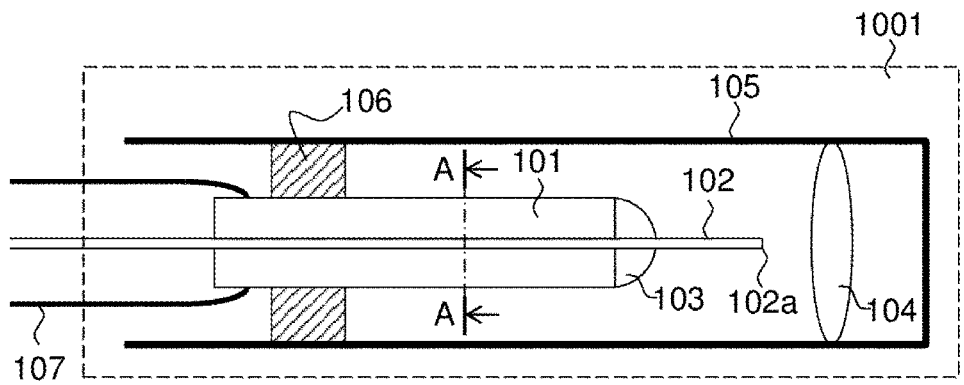

[FIG. 3]
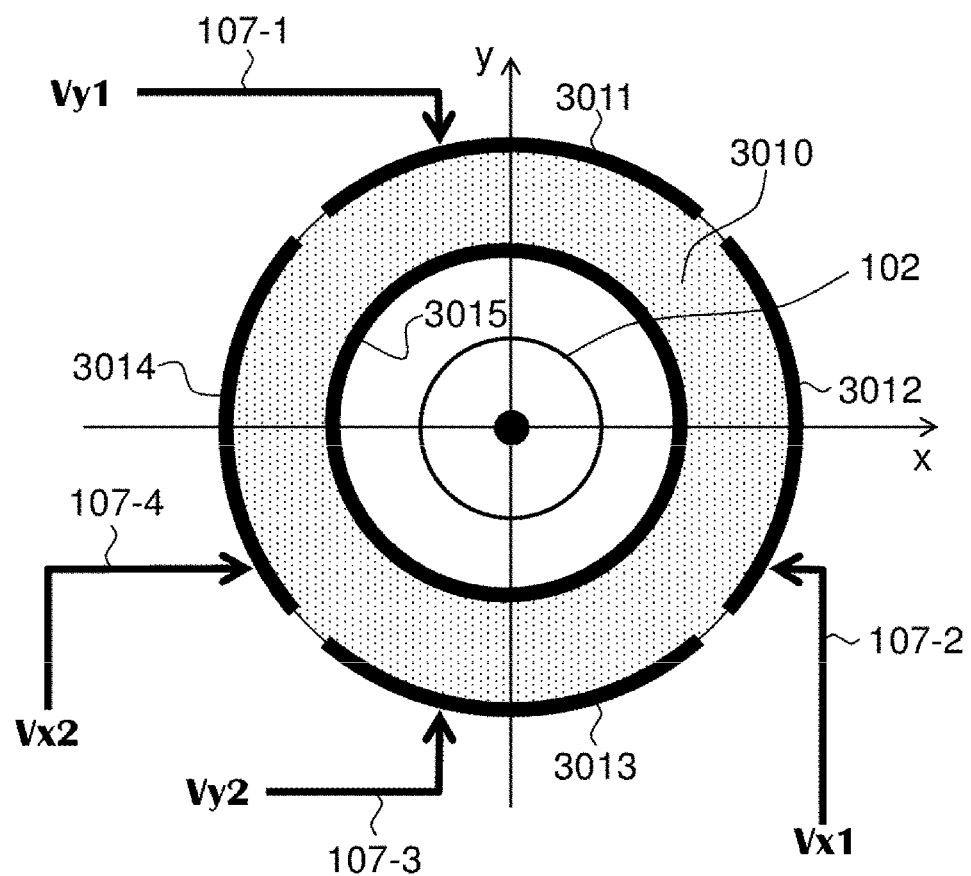

[FIG. 4]
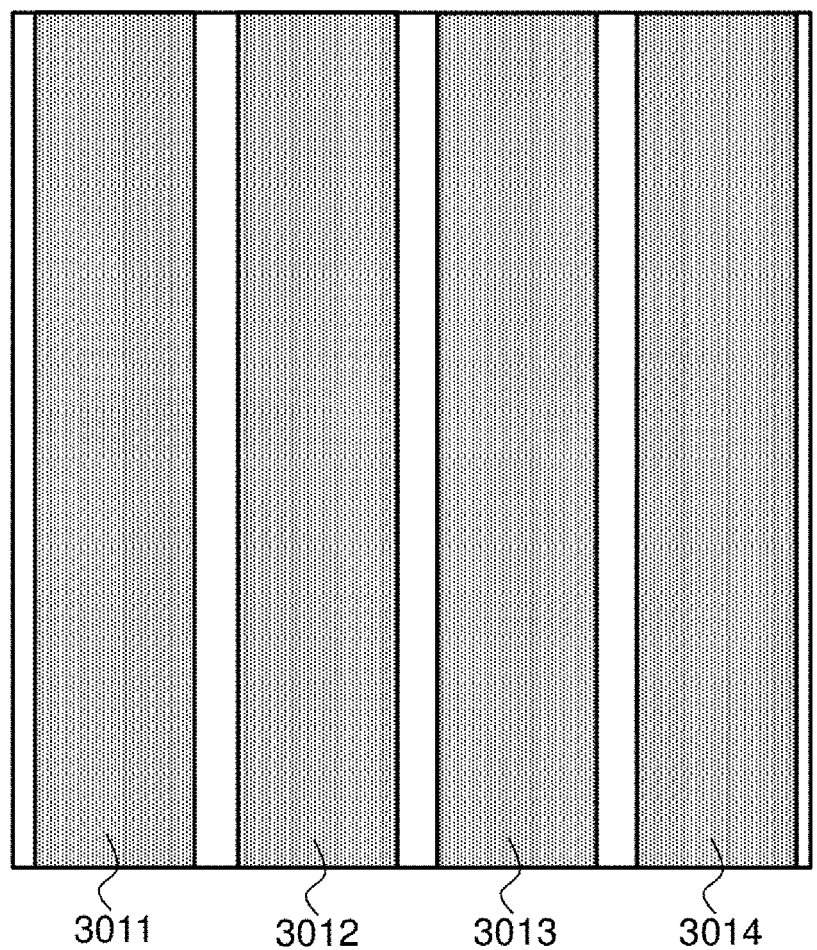
3011  3012  3013  3014

[FIG. 5]
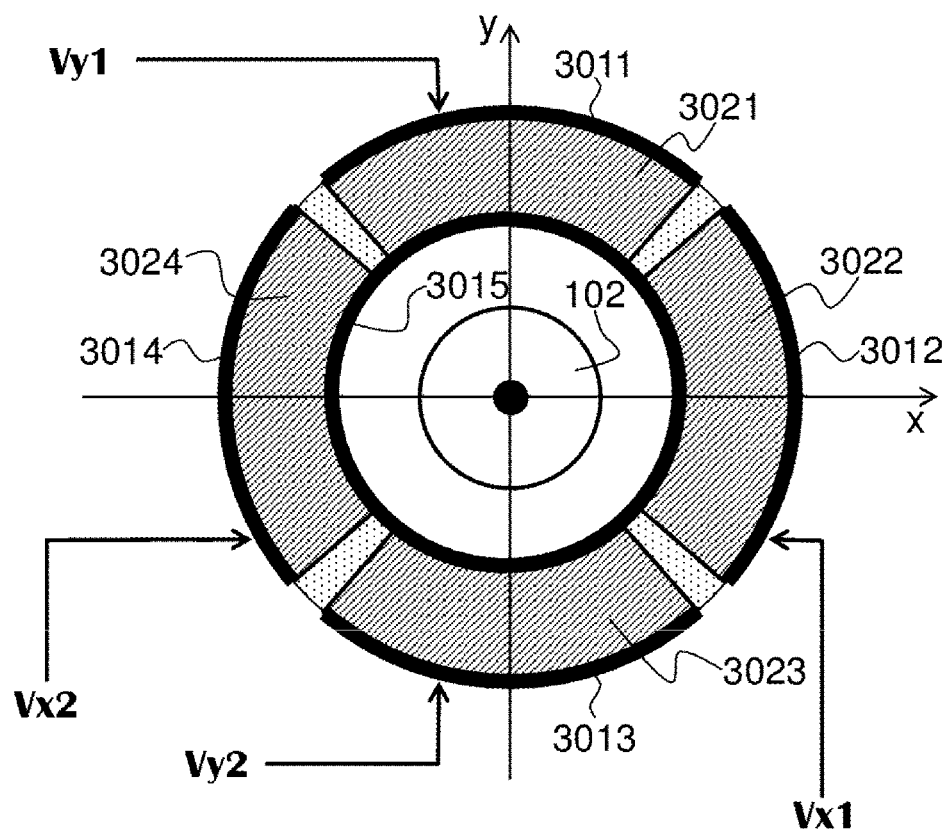

[FIG. 6]
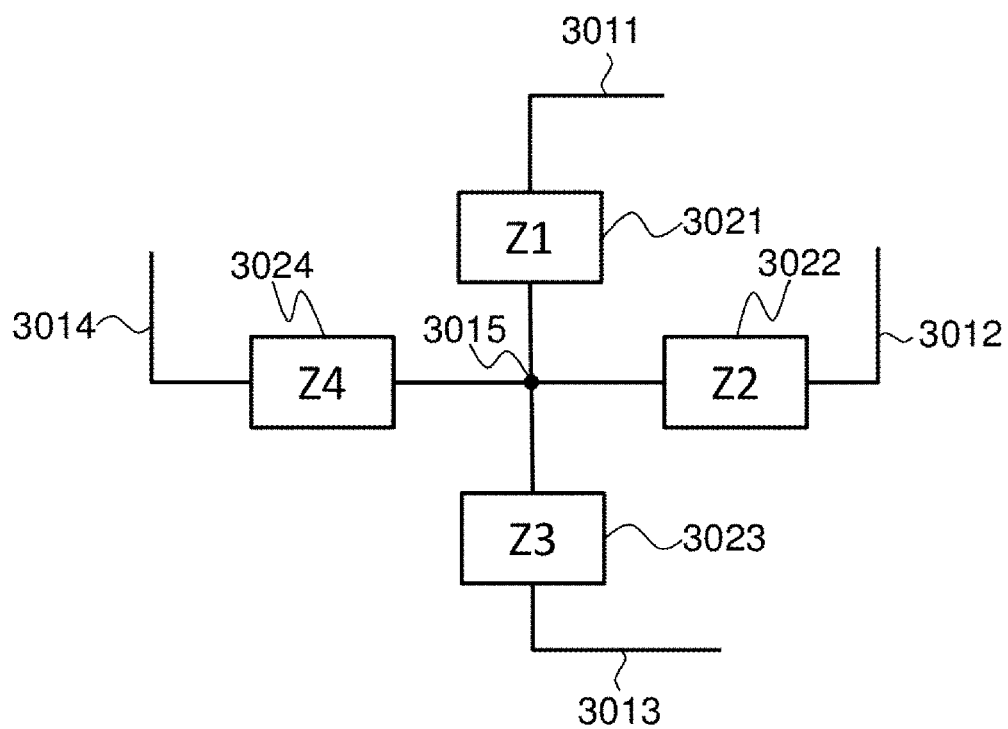

------ SCANNING TRAJECTORY
● LIGHT SOURCE MODULATION POINT

[FIG. 11]
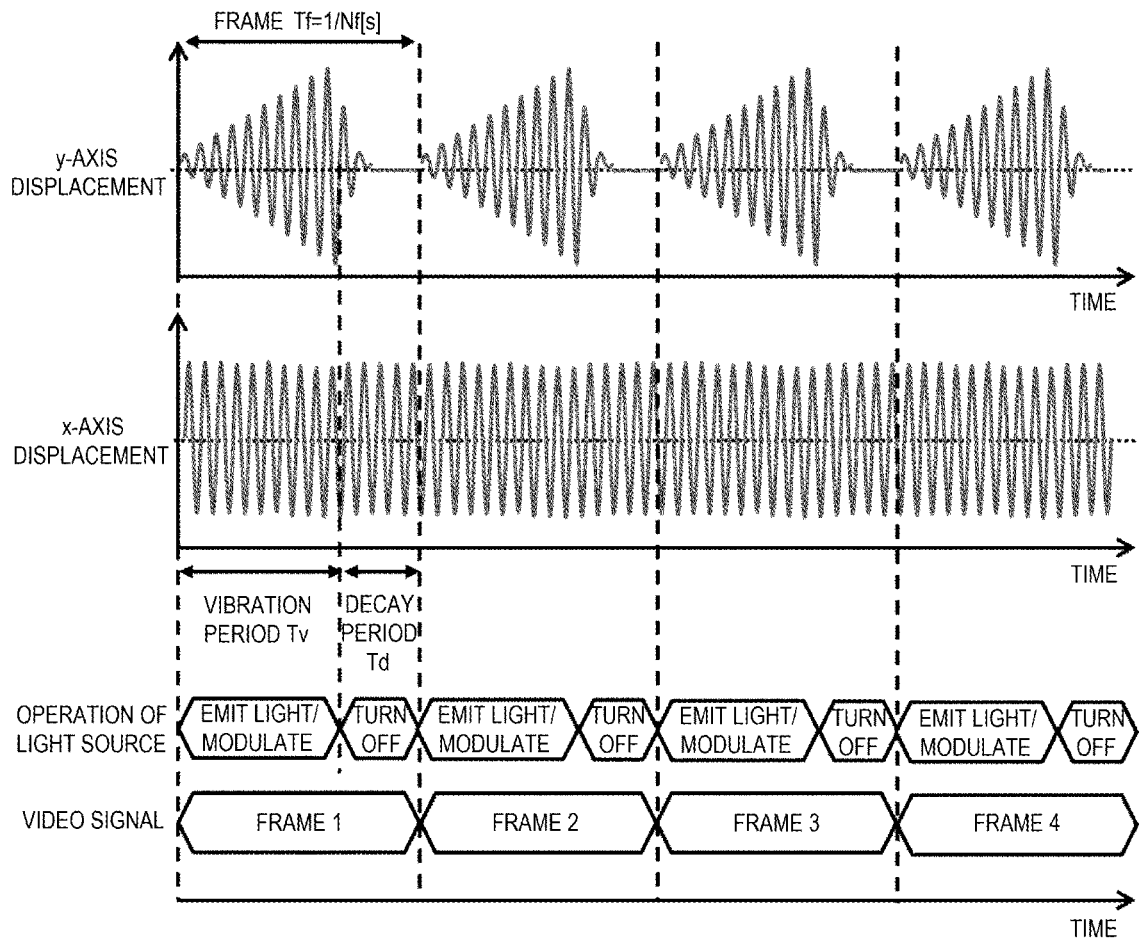
[FIG. 12]
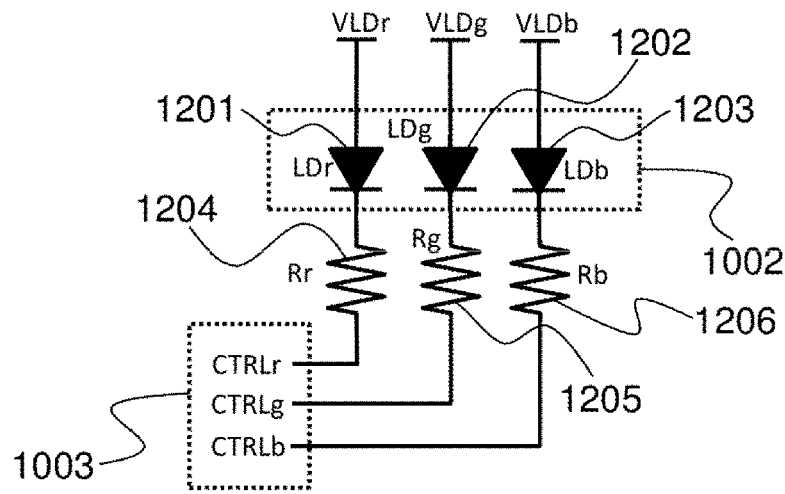

[FIG. 13]
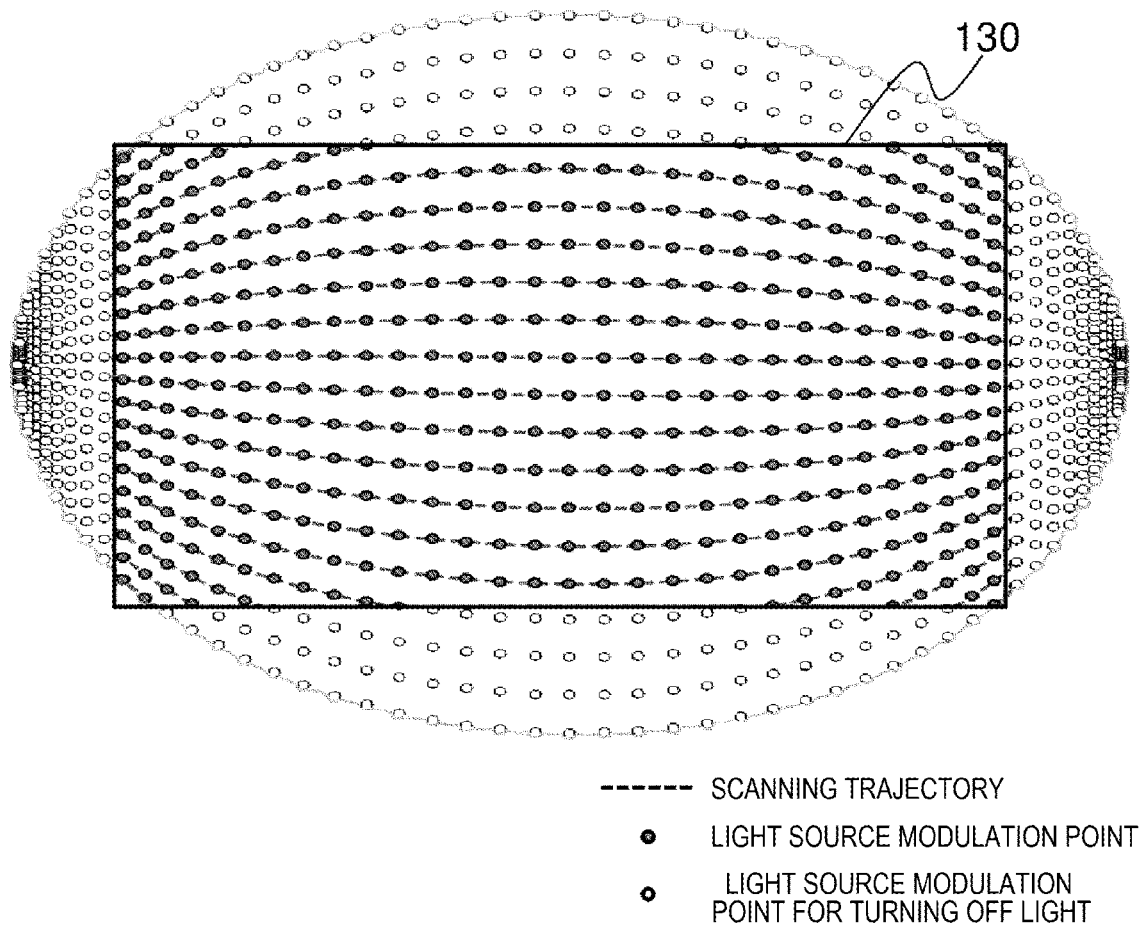
------- SCANNING TRAJECTORY
● LIGHT SOURCE MODULATION POINT
○ LIGHT SOURCE MODULATION POINT FOR TURNING OFF LIGHT

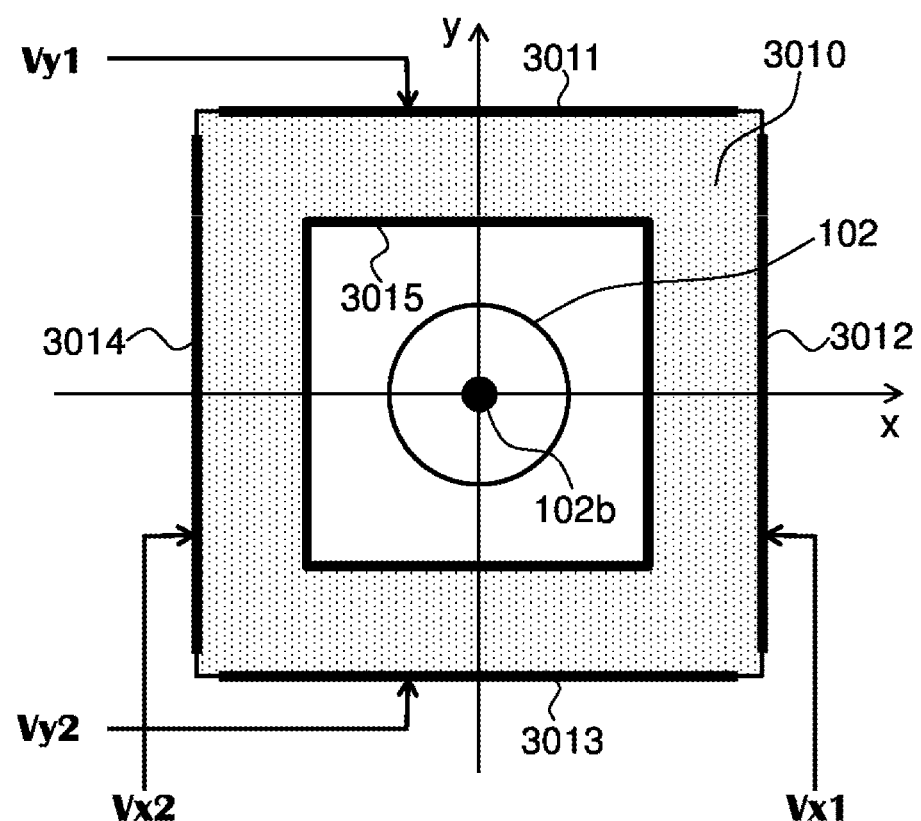
[FIG. 14]

[FIG. 15]
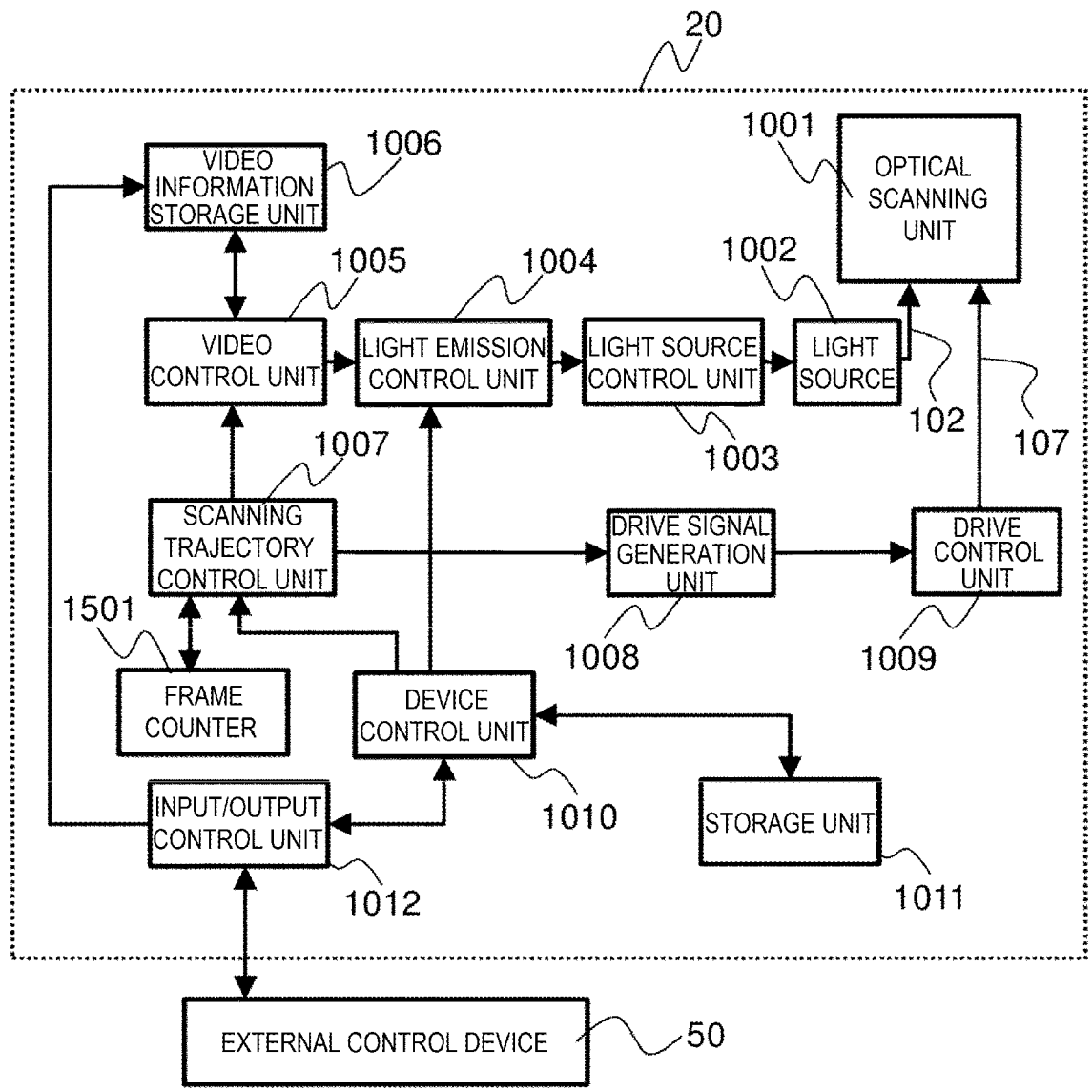

[FIG. 16]
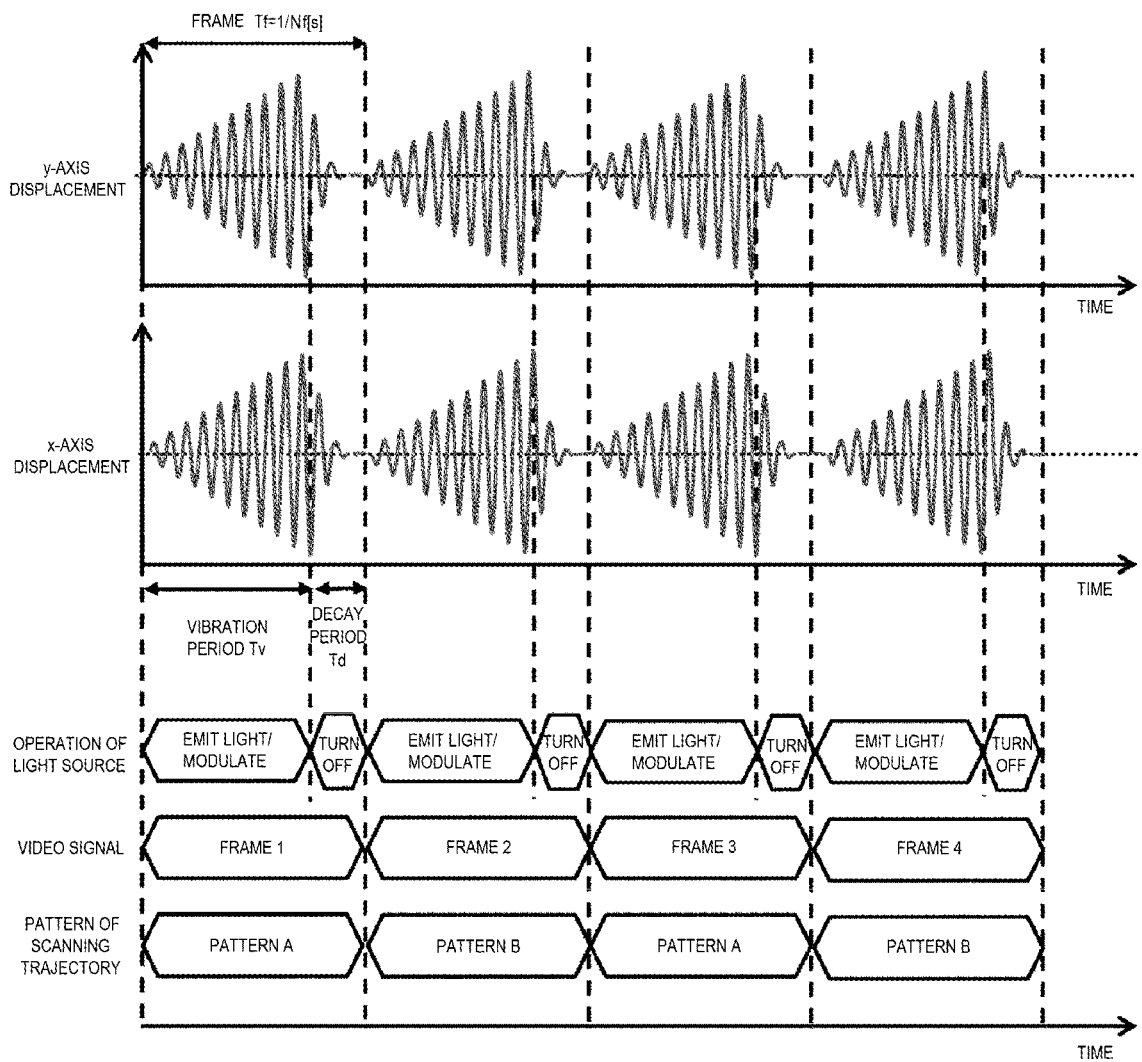

[FIG. 18]
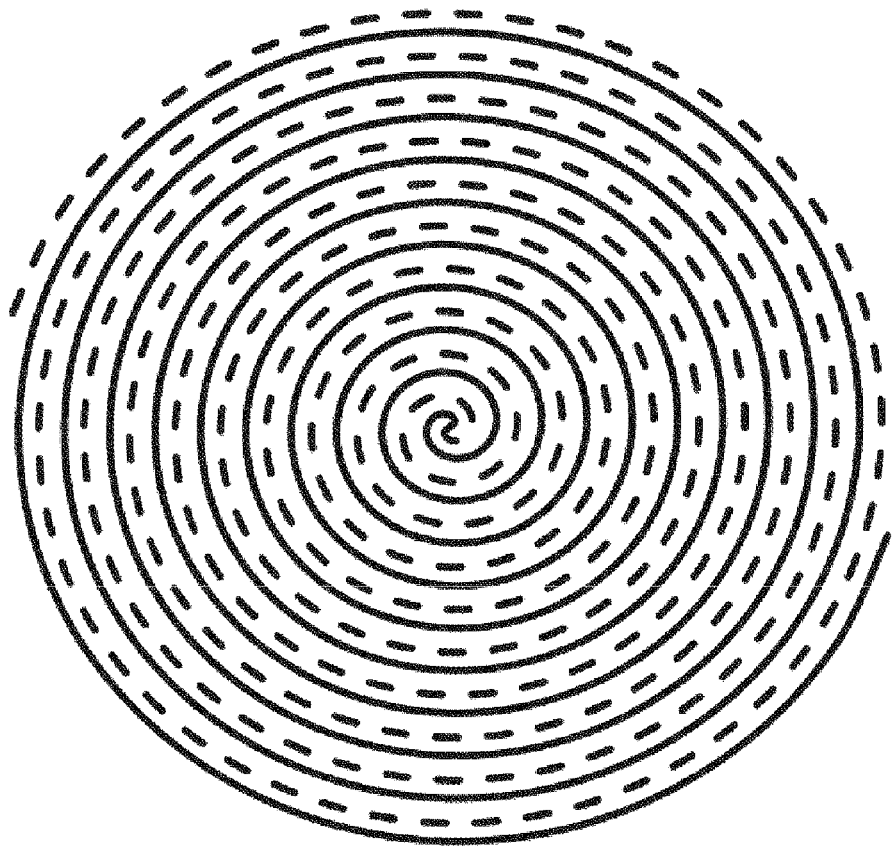
———— TRAJECTORY OF PATTERN A
------ TRAJECTORY OF PATTERN B

[FIG. 19]
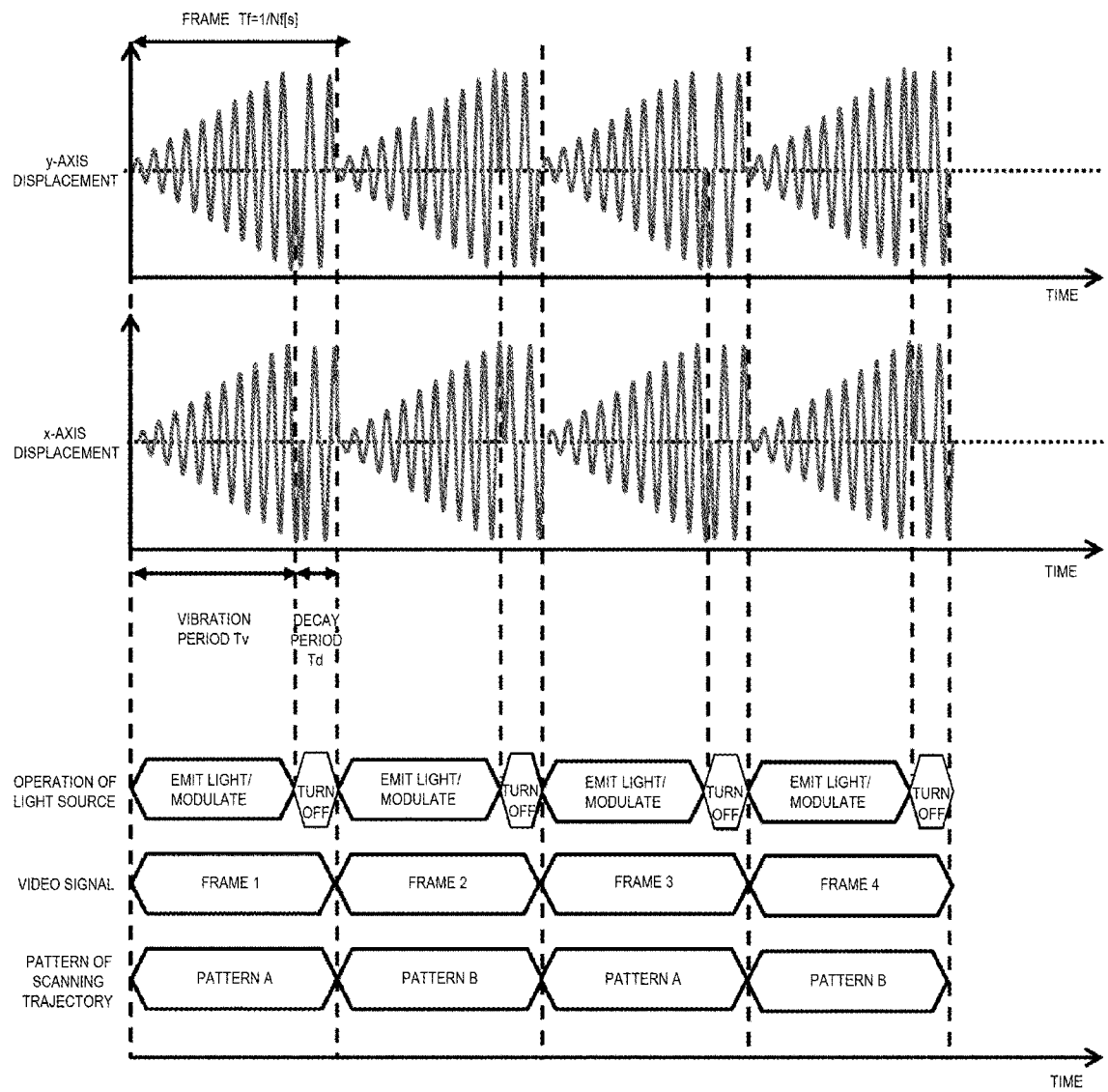

[FIG. 20]
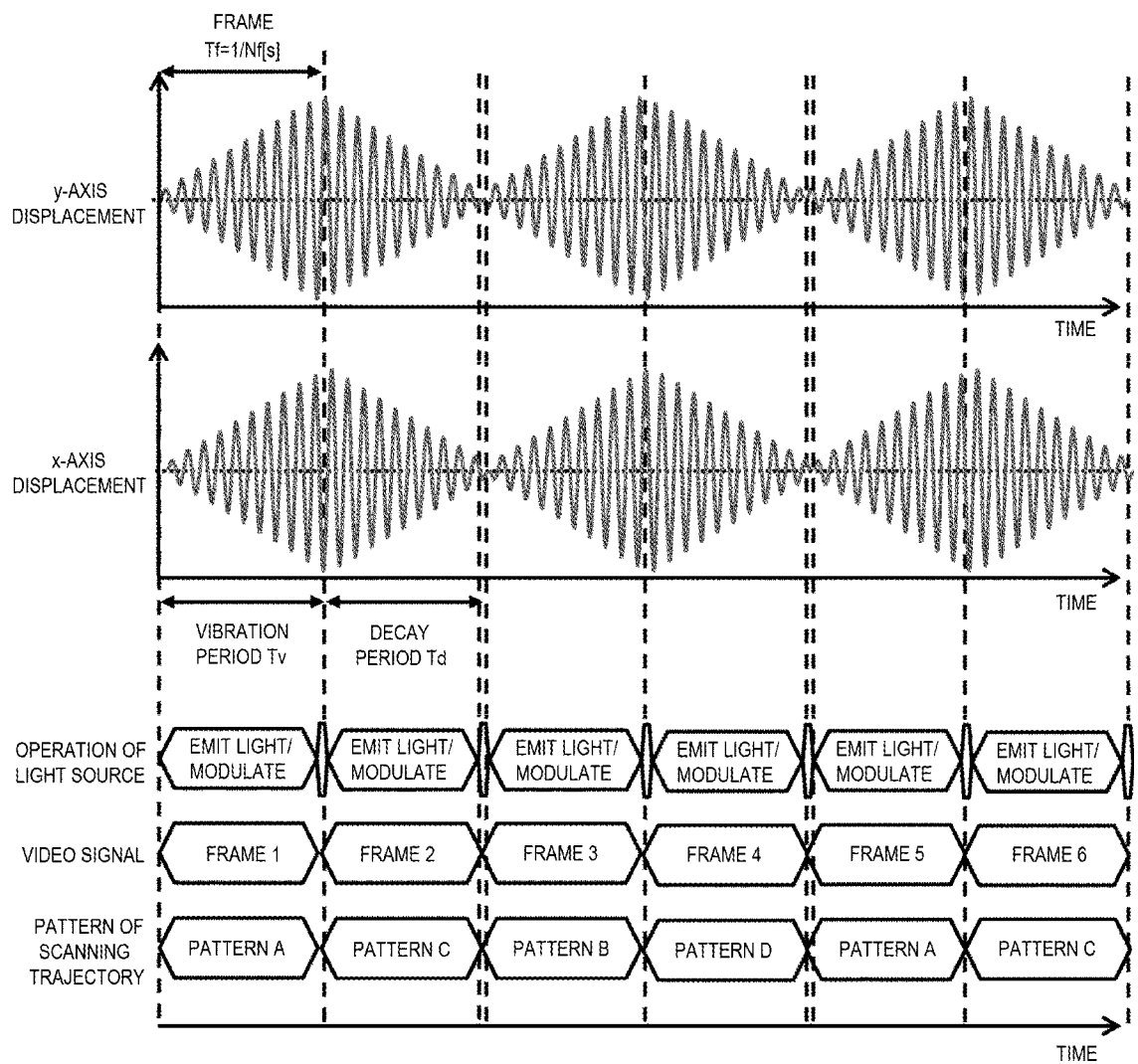

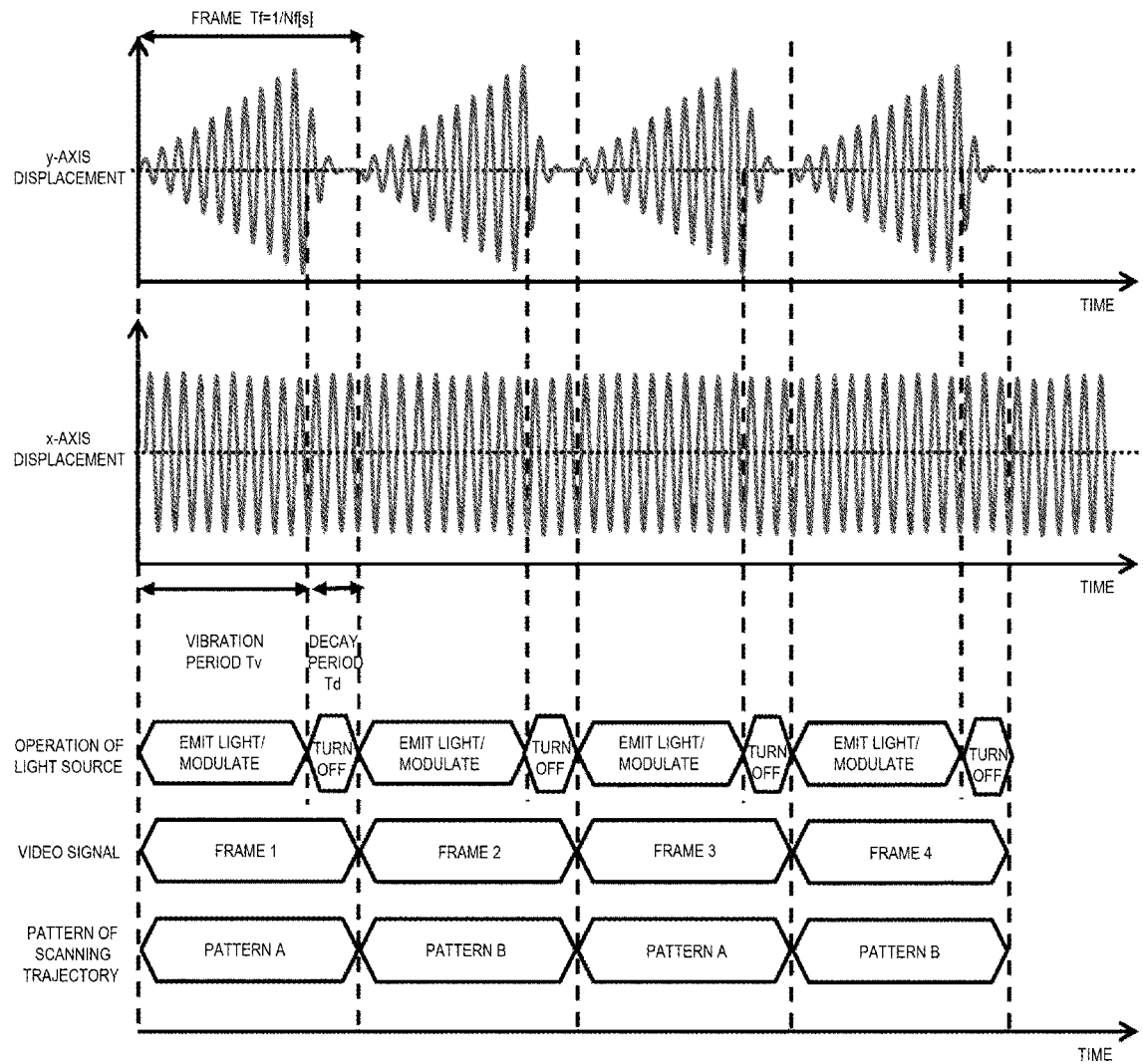
[FIG. 21]

[FIG. 22]
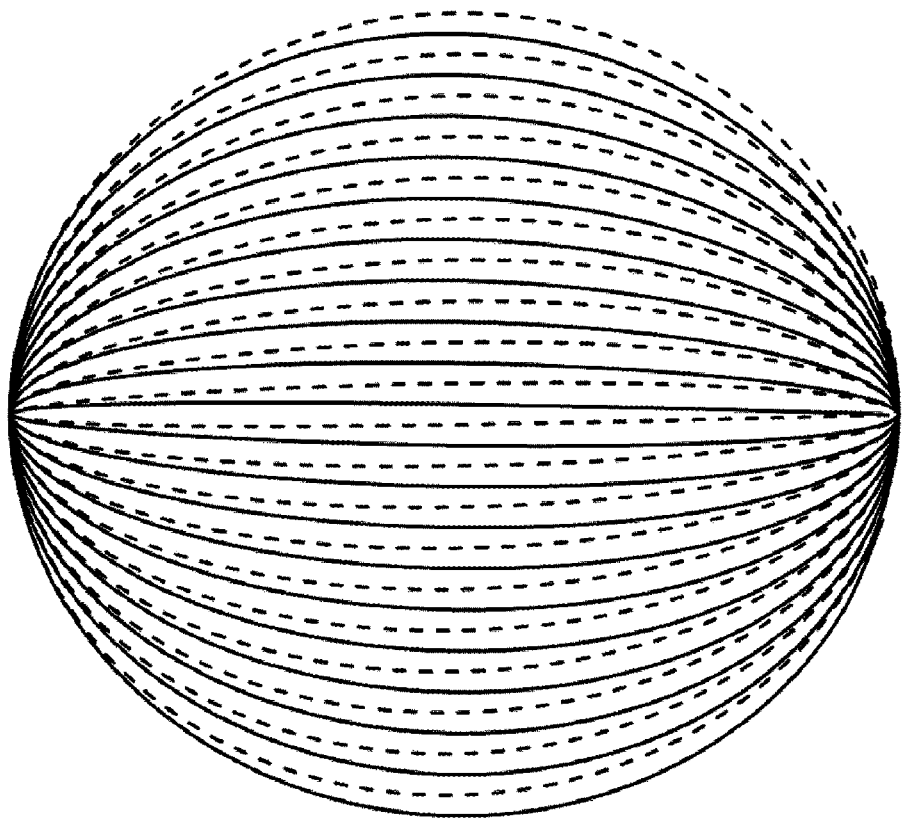
— TRAJECTORY OF PATTERN A
------- TRAJECTORY OF PATTERN B

[FIG. 23]
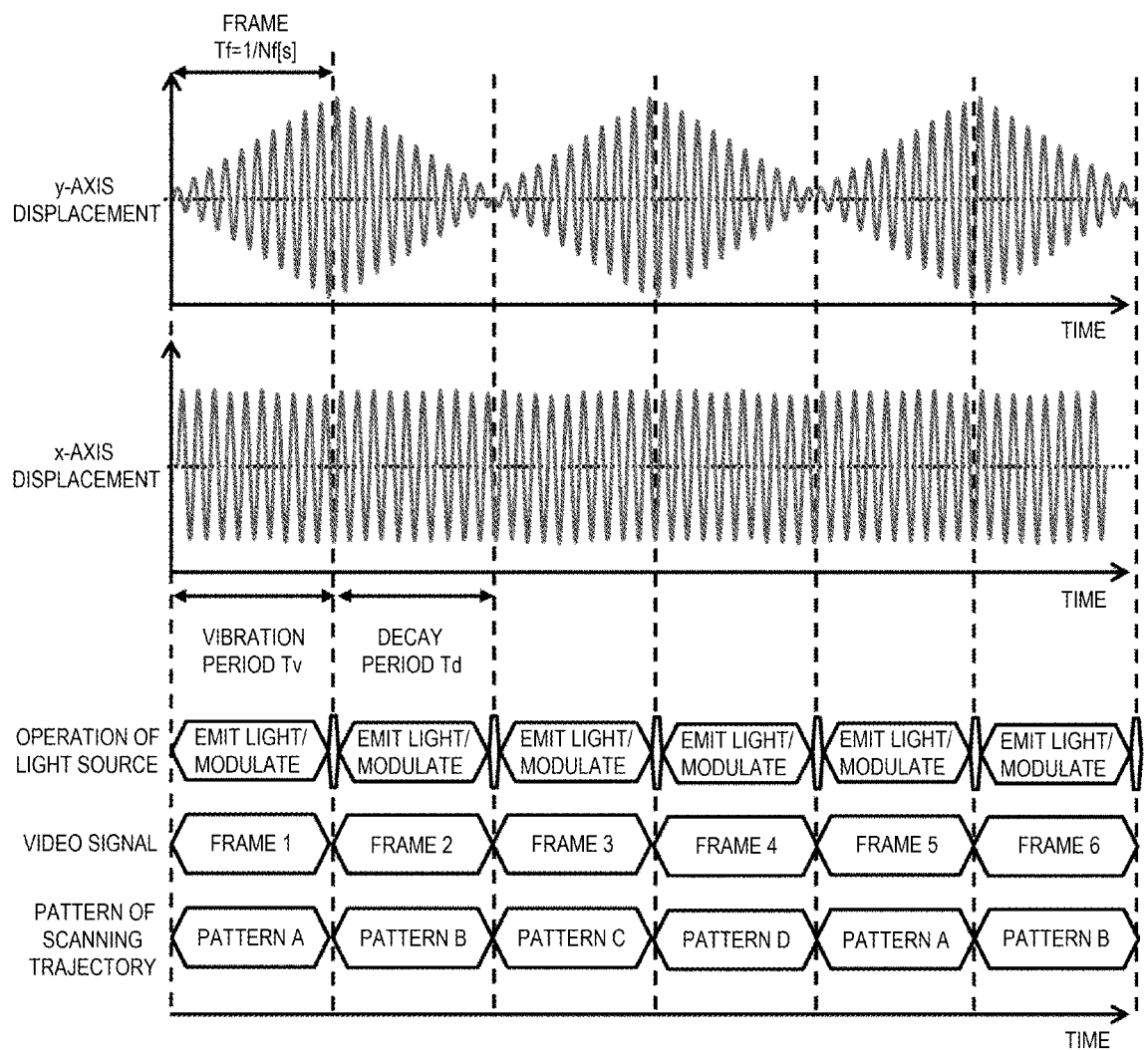

[FIG. 24]
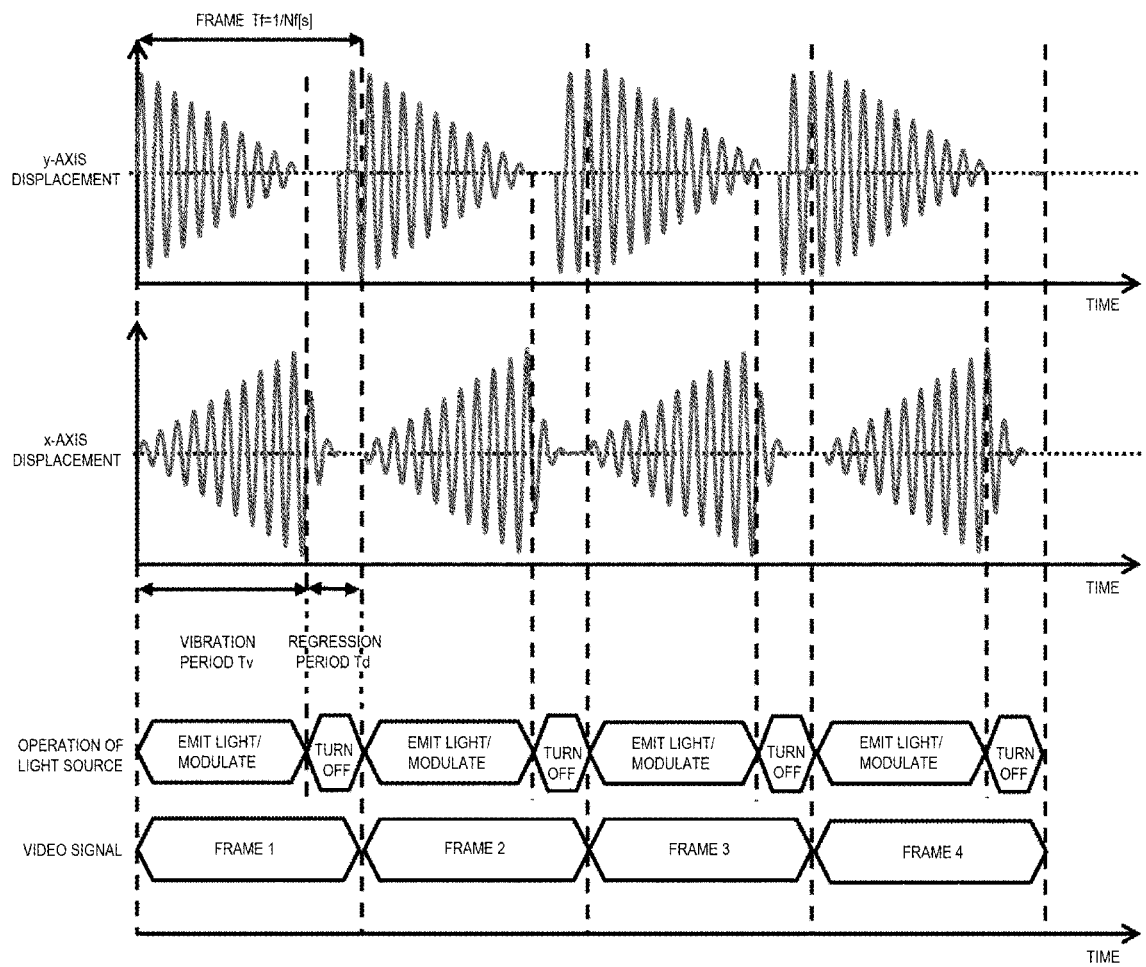

----- SCANNING TRAJECTORY
● LIGHT SOURCE MODULATION POINT

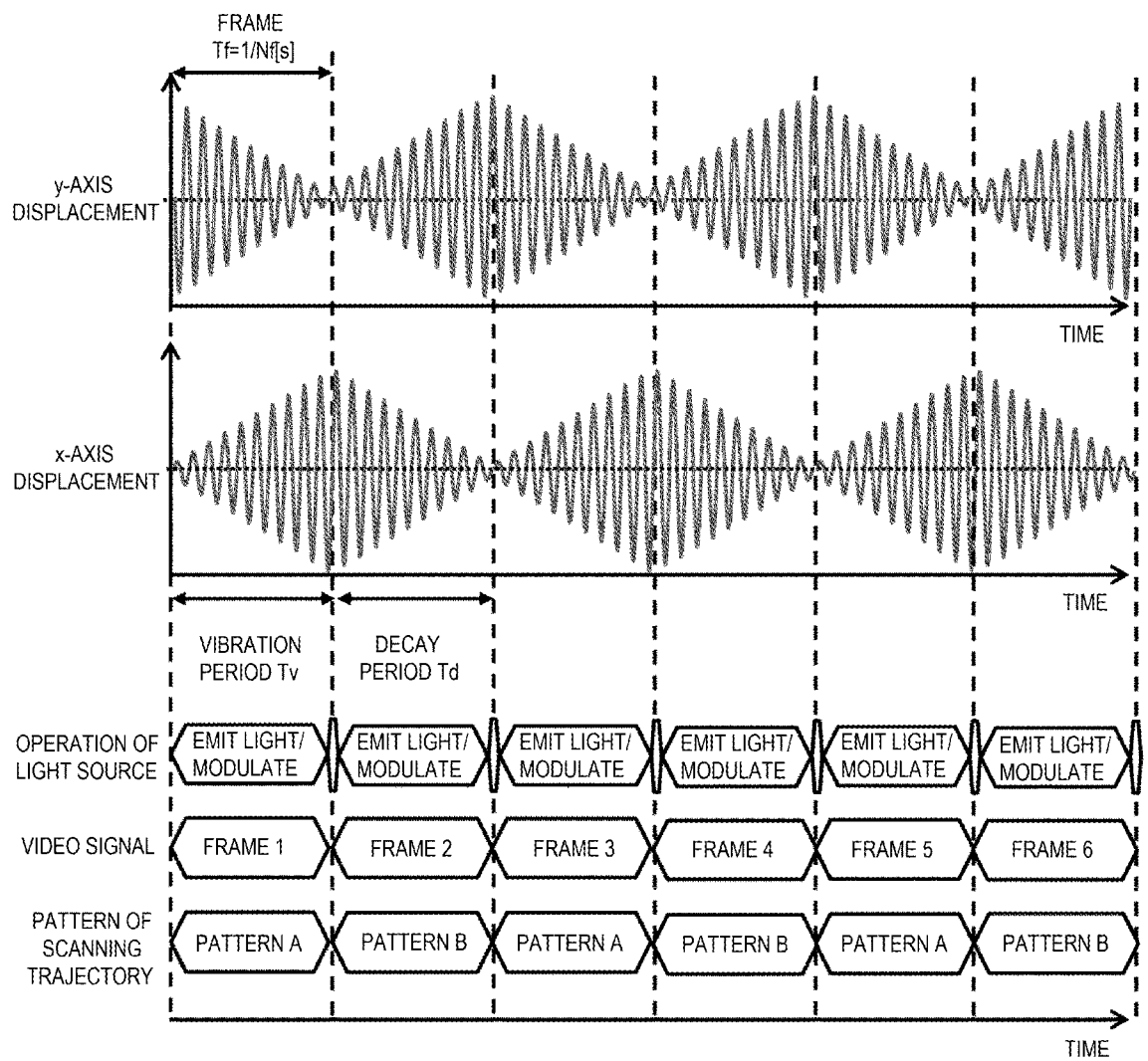
[FIG. 27]

[FIG. 28]
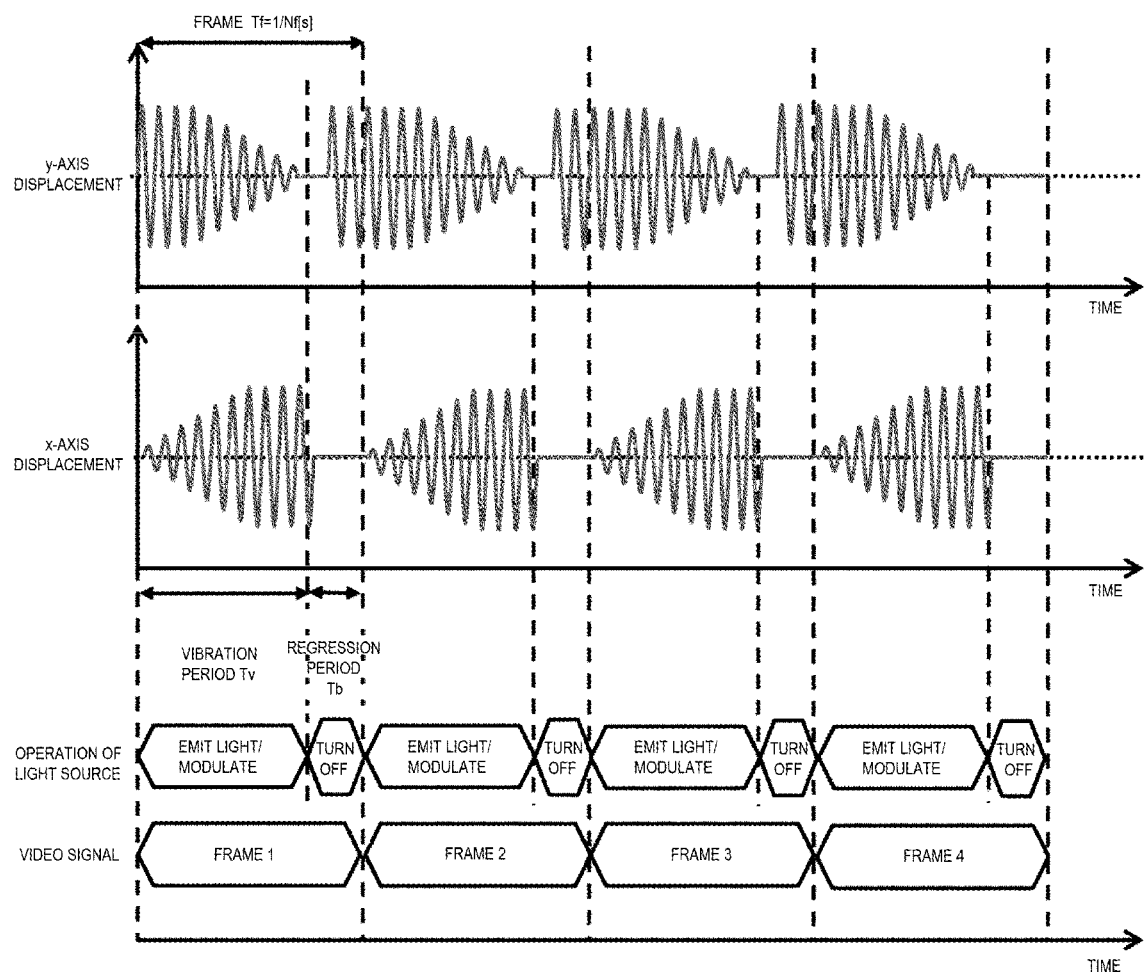

- - - - - - SCANNING TRAJECTORY
● LIGHT SOURCE MODULATION POINT
○ LIGHT SOURCE MODULATION POINT FOR TURNING OFF LIGHT

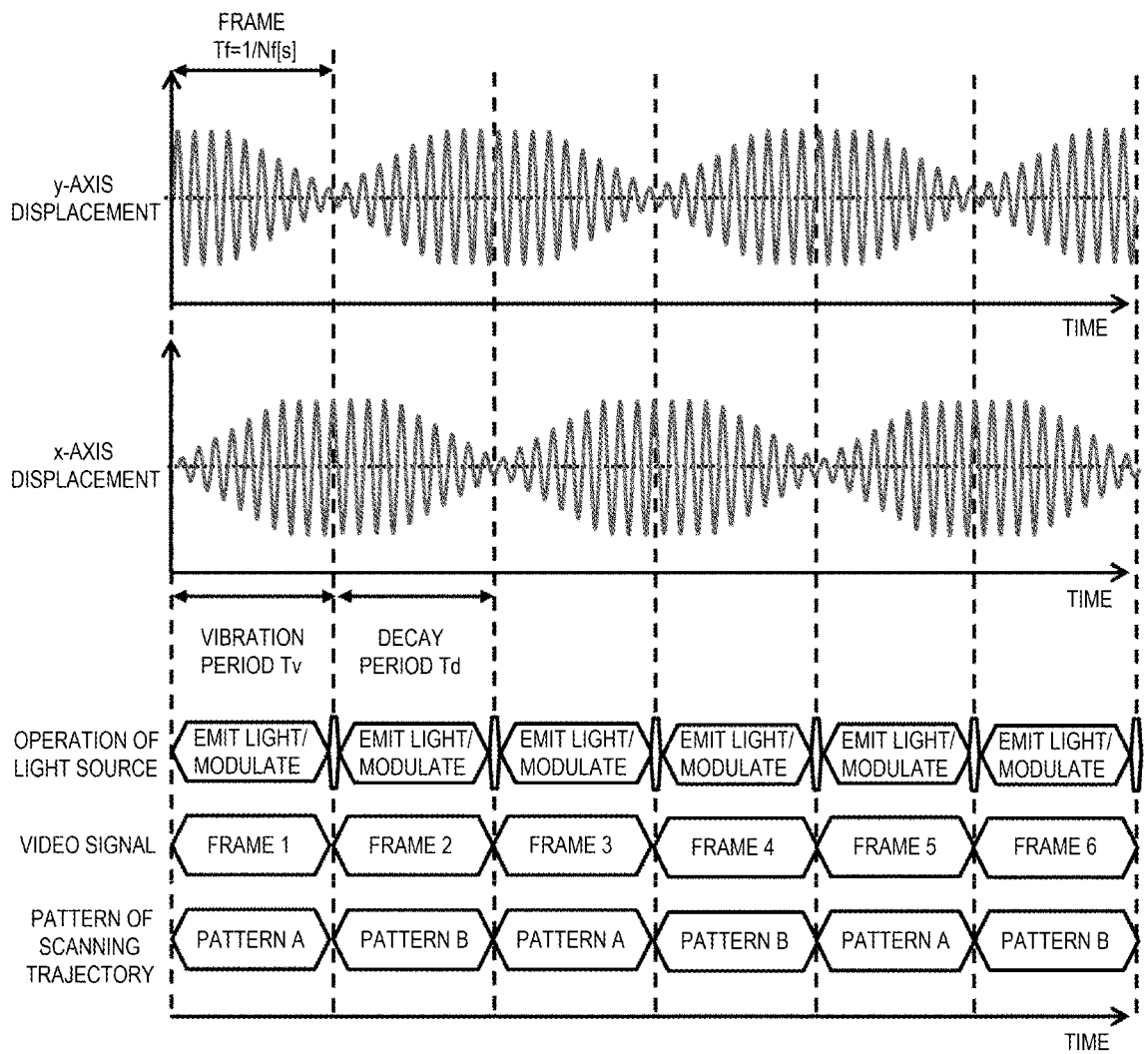
[FIG. 31]

[FIG. 32]
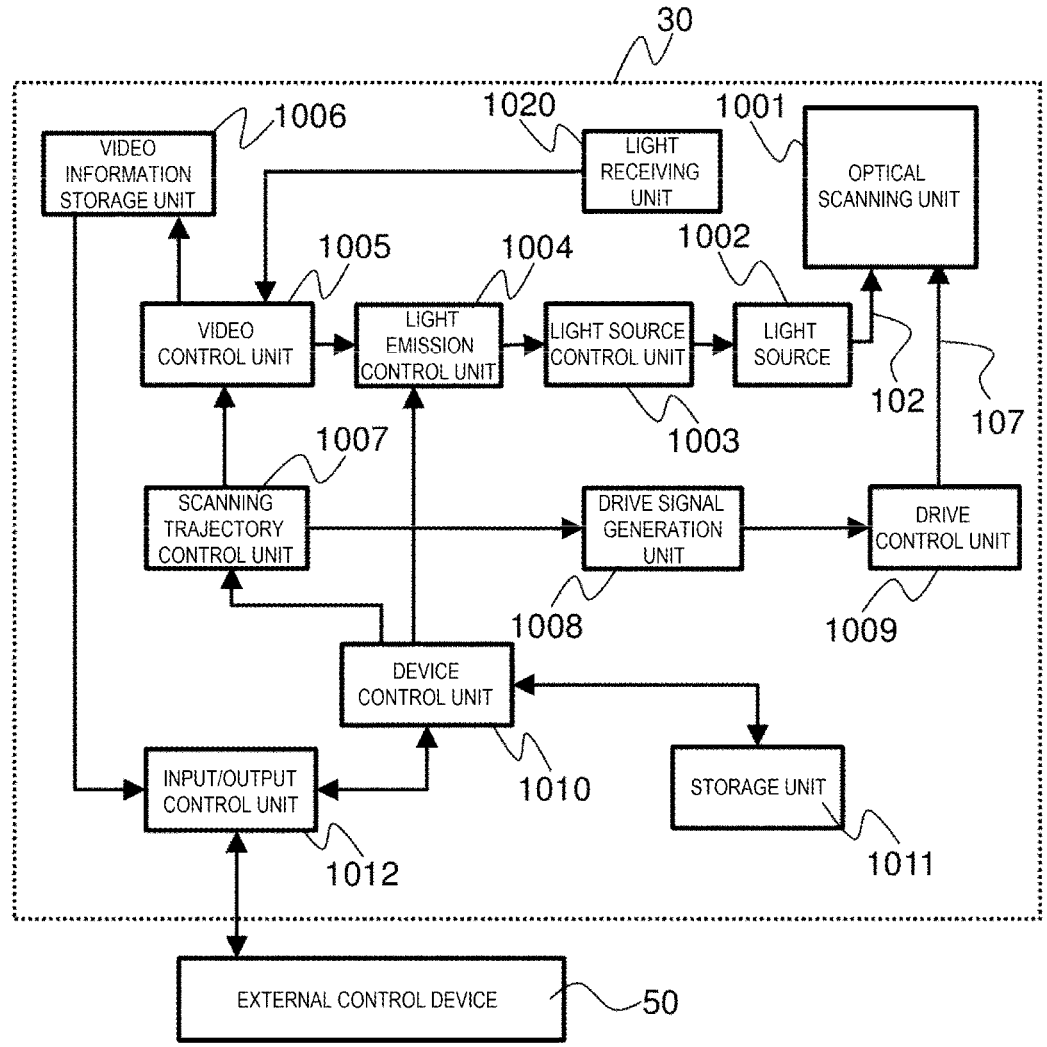
[FIG. 33]
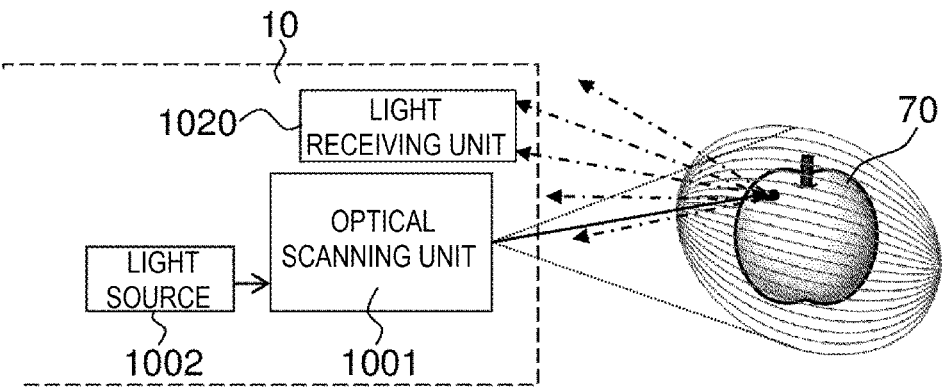

VIDEO DEVICE

TECHNICAL FIELD

The present invention relates to a video device including an optical scanning unit in which one end of a light guide path has a protruding beam-shaped structure.

BACKGROUND ART

There has been a scanning fiber device that performs scan toward an object from a tip portion of an optical fiber with light, and detects light reflected or scattered by the object or fluorescence generated on the object (see, for example, PTL 1). In such a device, in order to scan the object with the emitted light, by cantilever-supporting a part of the optical fiber in a state where the tip portion from which the light is emitted can swing, and disposing a piezoelectric element in a vicinity of a supporting portion, the optical fiber can vibrate.

A scanning method of the optical fiber includes, generally, spiral scanning using a spot of emitted light for scanning by drawing a spiral, and in a spiral scanning pattern, a vibration frequency is set to a resonance frequency.

PRIOR ART LITERATURE

Patent Literature

PTL 1: US Patent Publication No. 2008/0265178

SUMMARY OF INVENTION

Technical Problem

In the scanning fiber device described in PTL 1, spiral scanning is performed through the vibration at the tip portion of the optical fiber by an actuator that can vibrate on two axes.

When a spiral scanning trajectory is obtained with a constant vibration frequency determined by the resonance frequency, it is necessary to perform scanning for returning the trajectory to the center of the spiral. By such an operation, a moving speed at a center portion of the spiral is extremely decreased. When equal amounts of light are emitted per unit time from the optical fiber, a decrease in the moving speed becomes a factor that generates unevenness in overall brightness, for example, there is a tendency for light to increase at the center portion of the spiral.

Since the number of scan lines on a top, a bottom, a left and a right is equal in a spiral scanning trajectory when considering the application to incorporate a scanning fiber device into a projector for projection onto a screen, when the spiral scanning trajectory is applied to video devices of with different resolutions in a horizontal direction and a vertical direction such as 4:3 and 16:9, a larger number of rotations are necessary to obtain the required resolution.

Since a center portion of the trajectory is equivalent to a position in a substantially non-vibration state where the resonantly vibrating optical fiber returns, control and processing time are necessary for preventing vibration.

An object of the invention is to provide a video device that implements high image quality with high resolution and reduced uneven brightness by properly disposing light source modulation points by controlling the trajectory or speed of fiber scanning with a small number of rotations, even when horizontal and vertical resolutions are different.

Solution to Problem

A preferred example of a video device of the invention includes an optical scanning unit including a light guide path in which light enters from one end and emits from the other end, and a vibration unit configured to apply vibration to the light guide path via a joint unit in a vicinity of the other end of the light guide path; a drive signal generation unit that generates a drive signal for inducing vibration in the vibration unit; and a scanning trajectory control unit which has a function of independently vibrating the light guide path in a first direction substantially perpendicular to an optical axis direction of the light guide path, and in a second direction substantially perpendicular to the optical axis direction of the light guide path and substantially perpendicular to the first direction by the vibration unit, and which generates a first drive signal configured to drive the vibration unit in the first direction and a second drive signal configured to drive the vibration unit in the second direction with any pattern, in which the scanning trajectory control unit generates the first drive signal and the second drive signal as sine waves having different phases and a substantially same frequency, and sets a modulation amount of an amplitude modulation of a sine wave of the second drive signal to be larger than a modulation amount of an amplitude modulation of a sine wave of the first drive signal.

In addition, a preferred example of a video device of the invention includes an optical scanning unit including a light guide path in which light enters from one end and emits from the other end, and a vibration unit configured to apply vibration to the light guide path via a joint unit in a vicinity of the other end of the light guide path; a drive signal generation unit that generates a drive signal for inducing vibration in the vibration unit; a scanning trajectory control unit which has a function of independently vibrating the light guide path in a first direction substantially perpendicular to an optical axis direction of the light guide path, and in a second direction substantially perpendicular to the optical axis direction of the light guide path and substantially perpendicular to the first direction by the vibration unit, and which generates a first drive signal configured to drive the vibration unit in the first direction and a second drive signal configured to drive the vibration unit in the second direction with any pattern; and a counter configured to measure the number of cycles of optical scanning performed periodically which constitutes a frame of a video, in which the scanning trajectory control unit switches phases of the first drive signal and the second drive signal according to a measurement result of the counter, and performs optical scanning with different trajectories.

Advantageous Effect

According to the invention, it is possible to provide a video device with high image quality by controlling the trajectory or speed of fiber scanning.

BRIEF DESCRIPTION OF DRAWINGS

FIG. 1 is a block diagram of a video device according to a first embodiment.

FIG. 2 is a cross-sectional view of an optical scanning unit of the video device according to the first embodiment.

FIG. 3 is a cross-sectional view of the optical scanning unit of the video device according to the first embodiment.

FIG. 4 is a development view showing a configuration of an outer peripheral electrode of a vibration unit according to the first embodiment.

FIG. 5 is a cross-sectional view of the optical scanning unit according to the first embodiment.

FIG. 6 is an electrical equivalent circuit diagram of the optical scanning unit according to the first embodiment.

FIG. 7($b$) is a diagram showing optical scanning displacement of the optical scanning unit according to the first embodiment.

FIG. 8($b$) is a diagram showing distributions of the optical scanning trajectories and light source modulation points according to the first embodiment.

FIG. 8($c$) is a diagram showing an operation of the video device according to the first embodiment.

FIG. 9($b$) is a diagram showing distributions of the optical scanning trajectories and the light source modulation points according to the first embodiment.

FIG. 10($b$) is a diagram showing distributions of the spiral optical scanning trajectory and the light source modulation points.

FIG. 11 is an operation timing chart of the video device according to the first embodiment.

FIG. 12 is a diagram showing an embodiment of a light source unit of the video device.

FIG. 13 is a diagram showing distributions of optical scanning trajectories and light source modulation points in a modification of the first embodiment.

FIG. 14 is a cross-sectional view showing another configuration of the optical scanning unit.

FIG. 15 is a block diagram of a video device according to a second embodiment.

FIG. 16 is an operation timing chart of the video device according to the second embodiment.

FIG. 17($b$) is a diagram showing an optical scanning trajectory of a pattern B according to the second embodiment.

FIG. 18 is a diagram showing optical scanning trajectories according to the second embodiment.

FIG. 19 is an operation timing chart of the video device according to a modification of the second embodiment.

FIG. 20 is an operation timing chart of the video device according to a modification of the second embodiment.

FIG. 21 is an operation timing chart of the video device according to a third embodiment.

FIG. 22 is a diagram showing optical scanning trajectories according to the third embodiment.

FIG. 23 is an operation timing chart of the video device according to a modification of the third embodiment.

FIG. 24 is an operation timing chart of a video device according to a fourth embodiment.

FIG. 25($b$) is a diagram showing distributions of the optical scanning trajectories and light source modulation points according to the fourth embodiment.

FIG. 26($b$) is a diagram showing distributions of the optical scanning trajectories and light source modulation points according to the fourth embodiment.

FIG. 27 is an operation timing chart of the video device according to a modification of the fourth embodiment.

FIG. 28 is an operation timing chart of the video device according to a fifth embodiment.

FIG. 29($b$) is a diagram showing distributions of the optical scanning trajectories and light source modulation points according to the fifth embodiment.

FIG. 30($b$) is a diagram showing distributions of the optical scanning trajectories and light source modulation points according to the fifth embodiment.

FIG. 31 is an operation timing chart of the video device according to the fifth embodiment.

FIG. 32 is a block diagram of a video device having an imaging function according to a sixth embodiment.

FIG. 33 is a diagram showing an operation of the video device having the imaging function.

DESCRIPTION OF EMBODIMENTS

Figure 7A:
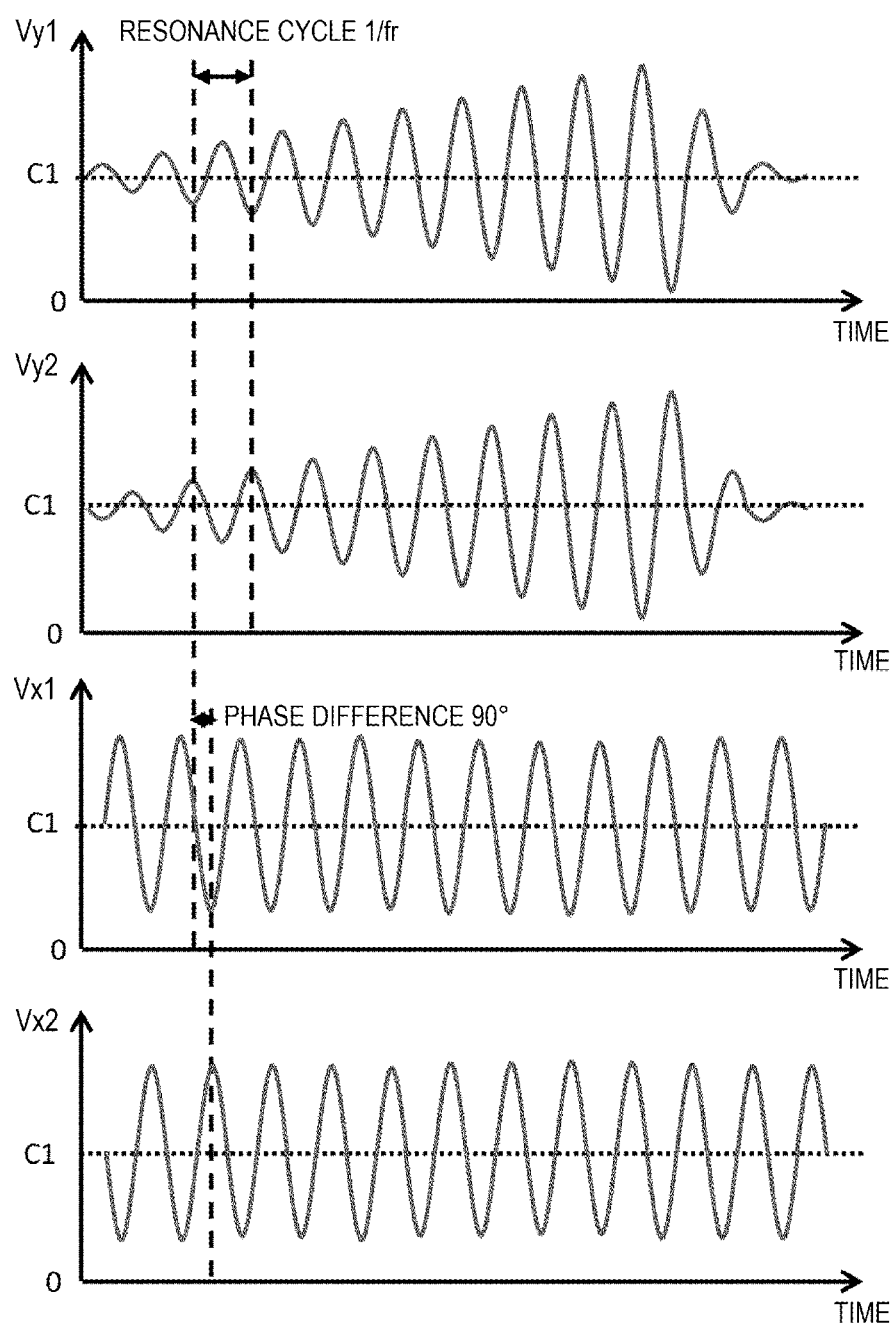
FIG. 7($a$) is a diagram showing a drive voltage applied to the optical scanning unit according to the first embodiment.

Embodiments of the invention will be described below with reference to the drawings.

First Embodiment

FIG. 1 is a block diagram showing a video device 10 including an optical scanning unit 1001 corresponding to a related scanning fiber device.

The video device 10 is a device having a function of projecting video, such as a projector or a head mounted display.

The video device 10 includes the optical scanning unit 1001, a light source unit 1002, a light source control unit 1003, a light emission control unit 1004, a video control unit 1005, a video information storage unit 1006, a scanning trajectory control unit 1007, a drive signal generation unit 1008, a drive control unit 1009, a device control unit 1010, a storage unit 1011, and an input/output control unit 1012.

As an example, the light emission control unit 1004, the video control unit 1005, the scanning trajectory control unit 1007, and the drive signal generation unit 1008 in the present embodiment are implemented as digital circuits. These circuits may exist as functional blocks in an integrated circuit of, for example, a Field Programmable Gate Array (FPGA) or an Application Specific Integrated Circuit (ASIC) with the same IC.

The device control unit 1010 controls each block in the video device 10. The device control unit 1010 is configured with, for example, a Central Processing Unit (CPU).

The video device 10 is connected to an external control device 50 via the input/output control unit 1012. The video device 10 in the present embodiment has a function of receiving a video signal from the external control device 50 and displaying the video. The input/output control unit 1012 can be configured to be integrated in the FPGA or ASIC as the same digital circuit as the light emission control unit 1004, the video control unit 1005, and the scanning trajectory control unit 1007, and can be configured in the device control unit 1010.

The storage unit 1011 is a memory area in which programs, data, or the like for performing processing in each unit are stored in order for the device control unit 1010 to control the video device 10, and is implemented by, for example, a flash memory. The storage unit 1011 may be another storage medium capable of writing and reading, such as a Hard Disc Drive (HDD) or an optical disk. In addition, the storage unit 1011 may be a temporary storage area such as a Random Access Memory (RAM).

If the video device 10 is a product such as a projector, a video signal is received from the external control device 50 such as a video device or a personal computer via the input/output control unit 1012, and the video signal is stored in the video information storage unit 1006.

Based on the control from the device control unit 1010, the scanning trajectory control unit 1007 generates a synchronization signal for performing scanning with a light by driving the optical scanning unit 1001, transmits the synchronization signal to the video control unit 1005, and determines a trajectory pattern of optical scanning performed by the optical scanning unit 1001 based on the synchronization signal. The drive signal generation unit 1008 generates a drive signal for scanning with the light by driving the optical scanning unit 1001 based on information of the trajectory pattern.

The drive signal generation unit 1008 is implemented by, for example, a DA converter. The drive signal output from the drive signal generation unit 1008 is applied to an actuator unit in the optical scanning unit 1001 by the drive control unit 1009.

The drive control unit 1009 supplies (107) drive power to the optical scanning unit according to the drive signal generated by the drive signal generation unit 1008, and is implemented by an amplifier or the like.

The video control unit 1005 receives the synchronization signal from the scanning trajectory control unit 1007 and calculates coordinates (x, y) determined according to an optical scanning position. Further, the video control unit 1005 reads pixel data corresponding to the coordinates (x, y) from the video information storage unit 1006. The pixel data is, for example, RGB gradation data. The pixel data is transmitted to the light emission control unit 1004.

The light emission control unit 1004 generates a signal for a light source 1002 to turn on light according to the received pixel data. The light emission control unit 1004 may correct luminance based on information from the scanning trajectory control unit 1007.

The light source control unit 1003 supplies a current to laser elements in the light source unit 1002 based on the signal generated by the light emission control unit 1004 to generate laser light. The laser light enters (102) the optical scanning unit 1001 and generates a laser spot at an optically scanned position in a projection surface (not shown).

In this way, laser light emission control synchronized with the optical scanning position is performed to project video information on the projection surface.

The optical scanning unit 1001 will be described with reference to a cross-sectional view of FIG. 2. The optical scanning unit 1001 includes a vibration unit 101, a light guide path 102, a joint unit 103, a lens 104, an exterior unit 105, a support member 106, and an electrical wiring unit 107.

The vibration unit 101 is an actuator that generates vibration, and includes a piezoelectric actuator. The vibration unit 101 in the present embodiment is a cylindrical piezoelectric element having a hollow center portion, and is configured by disposing a plurality of electrodes on an inner circumference and an outer circumference of the vibration unit 101.

The light guide path 102 is disposed in the hollow portion of the vibration unit 101, and the vibration unit 101 and the light guide path 102 are mechanically joined by the joint unit 103. The vibration unit 101 is fixed to the exterior unit 105 by the support member 106.

The light guide path 102 is implemented by, for example, an optical fiber.

The joint unit 103 is implemented by, for example, an adhesive.

Since an end 102a of the light guide path 102 is a free end, and vibration of the vibration unit 101 is transmitted to the light guide path 102 by the joint unit 103, the free end 102a vibrates.

The light guide path 102 has a protruding beam-shaped structure having one end as a free end, and has a natural frequency which makes vibration easy.

The lens 104 is a lens molded from glass or resin. In addition to a spherical lens as shown, the lens 104 may be an aspherical lens, a Fresnel lens, or a gradient index distributed lens. The lens 104 may have a structure integrated with the tip portion 102a of the light guide path 102. In addition, the lens 104 may be configured with a plurality of lenses.

FIG. 3 shows a cross-sectional view of the vibration unit 101 taken along a line A-A. As described above, the vibration unit 101 is a cylindrical piezoelectric actuator having a hollow inside. 3010 is a piezoelectric medium made of a material having piezoelectricity, and has a common electrode 3015 on an inner peripheral portion, and has an electrode divided into four parts substantially every 90° in a rotational direction of a cylindrical axis of the cylindrical actuator on an outer peripheral portion, which are a first outer peripheral electrode 3011, a second outer peripheral electrode 3012, a third outer peripheral electrode 3013, and a fourth outer peripheral electrode 3014.

The electrodes provided in the cylindrical actuator are continuously disposed in a planar shape along a longitudinal direction of a cylindrical shape shown in FIG. 3. When the outer peripheral side surface is shown in a developed view in FIG. 4, the electrodes 3011 to 3014 having substantially the same size in the longitudinal direction are aligned in parallel.

The light guide path 102 is disposed in a center of the cylindrical piezoelectric actuator.

Each electrode in the outer peripheral portion is connected to the drive control unit 1008 by the electrical wiring unit 107, and any voltage can be applied.

The piezoelectric medium 3010 forms a plurality of piezoelectric elements for each area sandwiched between the electrodes.

This is shown in FIG. 5. Areas sandwiched between the four electrodes disposed on an outer periphery of the piezoelectric medium 3010 and the electrode on an inner periphery function as the piezoelectric elements, that is, a first piezoelectric element 3021 sandwiched between the first outer peripheral electrode 3011 and the common electrode 3015, a second piezoelectric element 3022 sandwiched between the second outer peripheral electrode 3012 and the common electrode 3015, a third piezoelectric element 3023 sandwiched between the third outer peripheral electrode 3013 and the common electrode 3015, and a fourth piezoelectric element 3024 sandwiched between the fourth outer peripheral electrode 3014 and the common electrode 3015.

For convenience, in FIG. 3, a vertical direction toward a page is defined as a y-axis and a horizontal direction is defined as an x-axis.

The piezoelectric actuator is used to vibrate the light guide path 102 at a center portion. A voltage is applied to the first piezoelectric element 3021 and the third piezoelectric element 3023 facing each other across the center portion, and when the first piezoelectric element 3021 is expanded and the third piezoelectric element 3023 is contracted, the light guide path 102 receives a force in a y-axis downward direction. Conversely, when the first piezoelectric element 3021 is contracted and the third piezoelectric element is expanded, the light guide path 102 receives a force in a y-axis upward direction. As described above, in order to apply vibration in the y-axis direction, the opposing first piezoelectric element 3021 and third piezoelectric element 3023 are operated as a pair. The light guide path 102 is made to resonate by using a voltage for applying vibration as a sine wave signal and setting a cycle to a cycle near a natural frequency.

Similarly, the second piezoelectric element 3022 and the fourth piezoelectric element 3024 facing each other are operated as a pair in order to apply vibration in an x-axis direction.

An electrical equivalent diagram of these four piezoelectric elements is as shown in FIG. 6. One end of each of the piezoelectric elements 3021 to 3024 is connected through the common electrode 3015. The voltage applied to each piezoelectric element is determined by a difference between each potential applied to the outer peripheral electrodes 3011 to 3014 and a potential of the inner peripheral electrode 3015. The inner peripheral electrode 3015 may be electrically grounded and have a potential of 0 or may be a float.

Regarding the voltage applied to each electrode, the voltage applied to the first outer peripheral electrode 3011 is Vy1, the voltage applied to the second outer peripheral electrode 3012 is Vx1, the voltage applied to the third outer peripheral electrode 3013 is Vy2, and the voltage applied to the fourth outer peripheral electrode 3014 is Vx2.

Each voltage is expressed by the following formula with respect to time t.

$$V_{y1} = A_1 \sin(2\pi f_r t + \varphi_1) + C_1 \quad \text{(Formula 1)}$$

$$V_{x1} = A_2 \sin(2\pi f_r t + \varphi_2) + C_2 \quad \text{(Formula 2)}$$

$$V_{y2} = A_3 \sin(2\pi f_r t + \varphi_3) + C_3 \quad \text{(Formula 3)}$$

$$V_{x2} = A_4 \sin(2\pi f_r t + \varphi_4) + C_4 \quad \text{(Formula 4)}$$

Here, $A_1$, $A_2$, $A_3$, and $A_4$ are vibration amplitudes, fr is a resonance frequency, $\varphi_1$, $\varphi_2$, $\varphi_3$, and $\varphi_4$ are initial phases of sine waves, and $C_1$, $C_2$, $C_3$, and $C_4$ are offset components.

Here, the first piezoelectric element 3021 and the third piezoelectric element 3023 are a pair of piezoelectric elements in the y-axis direction, and it is only necessary for the other piezoelectric element to expand when one piezoelectric element contracts, that is, the piezoelectric elements move in reversed phases. In order to achieve such a movement, $A_1 = A_3$ and $\varphi_3 = \varphi_1 + 180°$ are satisfied.

That is, a vibration amount in the y-axis direction is as in Formula 5.

$$Y \propto 2A_1 \sin(2\pi f_r t + \varphi_1) \quad \text{(Formula 5)}$$

Similarly, $$X \propto 2A_2 \sin(2\pi f_r t + \varphi_2) \quad \text{(Formula 6)}$$

the vibration amount in the x-axis direction is as in Formula 6.

In this way, the light guide path 102 can be vibrated by the vibration unit 101 by being independently controlled in the y-axis and in the x-axis, and scanned with light.

At this time, by shifting the phase $\varphi_1$ of the y-axis drive signal and the phase $\varphi_2$ of an x-axis drive signal by 90°, an optical scanning trajectory becomes a trajectory that draws a circle.

Further, by gradually increasing an amplitude $A_1$ of a y-axis drive signal and an amplitude $A_2$ of the x-axis drive signal with time, the optical scanning trajectory becomes a circle, and becomes a spiral trajectory as the amplitudes increase. Accordingly, a spot-shaped light spot can be scanned in a planar shape.

That is, $A_1$ and $A_2$ are taken as functions of time t. For example, it can be described as the following formula.

$$A_1(t) = a_1 t + b_1 \quad \text{(Formula 7)}$$

$$A_2(t) = a_2 t + b_2 \quad \text{(Formula 8)}$$

Here, $a_1$, $a_2$, $b_1$, and $b_2$ are 0 or positive values.

Figure 10A:
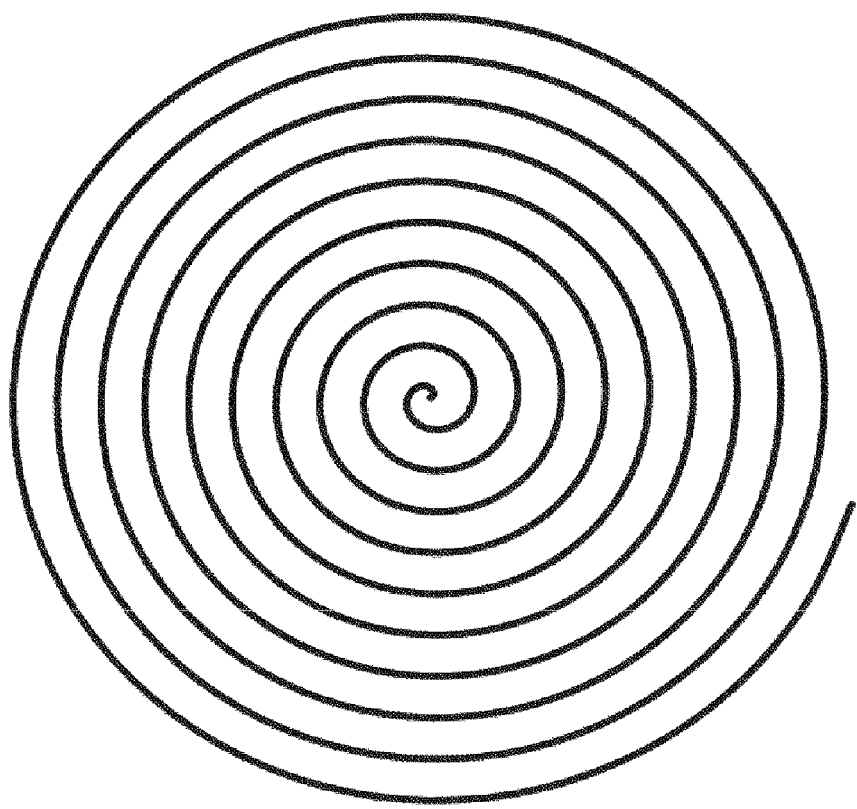
FIG. 10($a$) is a diagram showing a spiral optical scanning trajectory.

For example, when $a_1 = a_2$ and $b_1 = b_2 = 0$, a spiral trajectory is as shown in FIG. 10(a).

$A_1$ and $A_2$ are not limited to linear functions of time t as shown in Formula 7 and Formula 8.

Figure 7B:
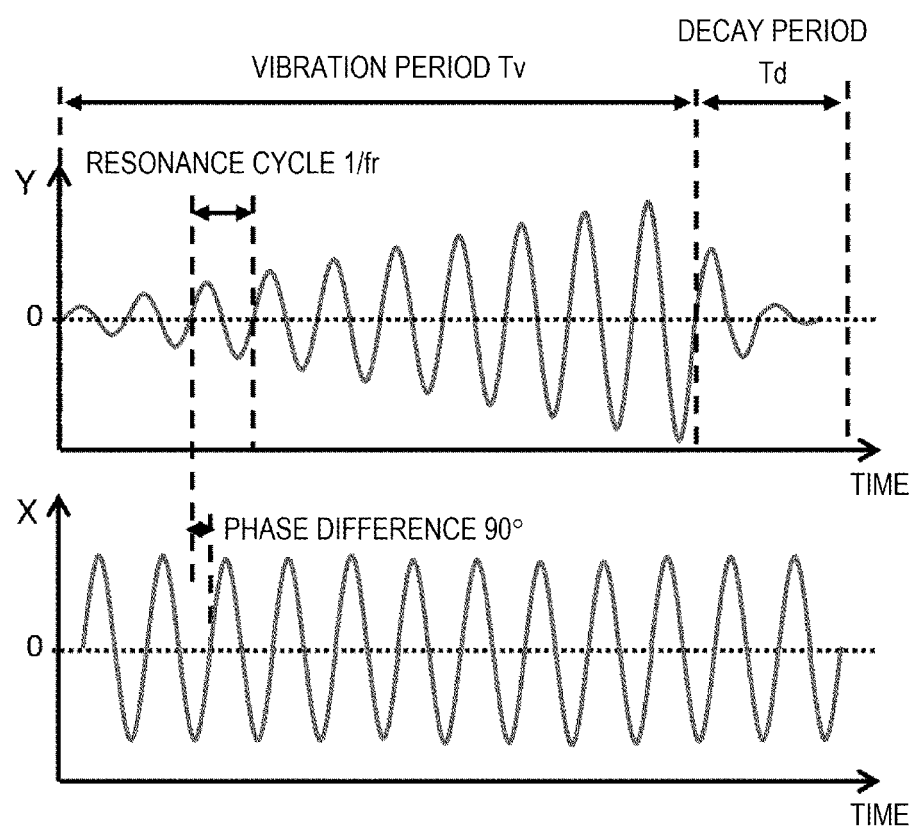

Here, the drive signal shown in FIG. 7(a) is applied to the vibration unit 101 by the scanning trajectory control unit 1007 according to the present embodiment. During a vibration period Tv, the amplitude $A_1$ of the y-axis drive signal is gradually increased with time, and during a decay period Td, the amplitude $A_1$ is decayed with time or becomes 0. The other amplitude $A_2$ of the x-axis drive signal is set to a substantially constant value. A displacement amount in the y-axis direction and a displacement amount in the x-axis direction are the displacements shown in FIG. 7(b). The optical scanning trajectory becomes a substantially elliptical shape, and becomes the trajectory shown in FIG. 8(a) as the amplitude on a short axis side increases.

In Formula 7 and Formula 8, for example, when $a_1 > 0$, $a_2 = 0$, $b_1 = 0$, and $b_2 > 0$ during the vibration period Tv, the above drive signal can be generated.

FIG. 12 shows the configurations of the light source control unit 1003 and the light source unit 1002.

The light source unit 1002 includes three laser diodes (LDs) of three primary colors, that is, a red LD 1201, a green LD 1202, and a blue LD 1203. The three LDs are connected in series with current limiting resistors 1204, 1205, and 1206, respectively, and applied with power supply voltages VLDr, VLDg, and VLDb, respectively. Voltage values of VLDr, VLDg, and VLDb can be set to any values by a power supply control unit (not shown), and accordingly, light emission of the red LD 1201, the green LD 1202, and the blue LD 1203 can be controlled. Terminals of the current limiting resistors 1204, 1205, and 1206 on an opposite side of the respective LDs are connected to the light source control unit 1003. The light source control unit 1003 can control a light emission amount and a light emission time of each of the red LD 1201, the green LD 1202, and the blue LD 1203 by changing the voltage of each terminal of CTRLr, CTRLg, and CTRLb.

The power supply voltages VLDr, VLDg, and VLDb may have the same value or of may be the same terminal. In addition, the voltage of each terminal CTRLr, CTRLg, and CTRLb of the light source control unit 1003 may have the same value or terminals CTRLr, CTRLg, and CTRLb may be the same terminal. However, it is necessary for the three LDs to be individually controlled. When terminals of VLDs are set to the same terminal and the CTRL terminals are set to the same terminal, it is necessary for a member such as a switch to be separately provided.

Although the light source unit 1002 has been described as a configuration having three primary colors LDs one by one, the invention is not limited to thereto. A structure which has one or more LDs of a single color may be provided. In addition, a light source other than the LD may be used. The three primary colors may be configured such that not only the primary color is emitted by the light source, and may be configured such that a specific color is extracted by a filter with, for example, a white light source and a dichroic filter or a color wheel.

In addition, the light emission control unit 1004 operates at a cycle sufficiently earlier than one cycle of the sine wave of the x-axis drive signal, generates a modulation signal at an early cycle with respect to the light source control unit 1003, and causes the light source unit 1002 to operate.

The cycle of the sine wave of the x-axis signal is an inverse number Tr=1/fr of the resonance frequency fr.

$$T_L \ll \frac{T_r}{2} \quad \text{(Formula 9)}$$

When a cycle for modulating the light source unit 1002 is set to TL, as shown in Formula 9, the light emission control unit 1004 makes the cycle sufficiently smaller than the resonance cycle Tr.

Figure 8A:
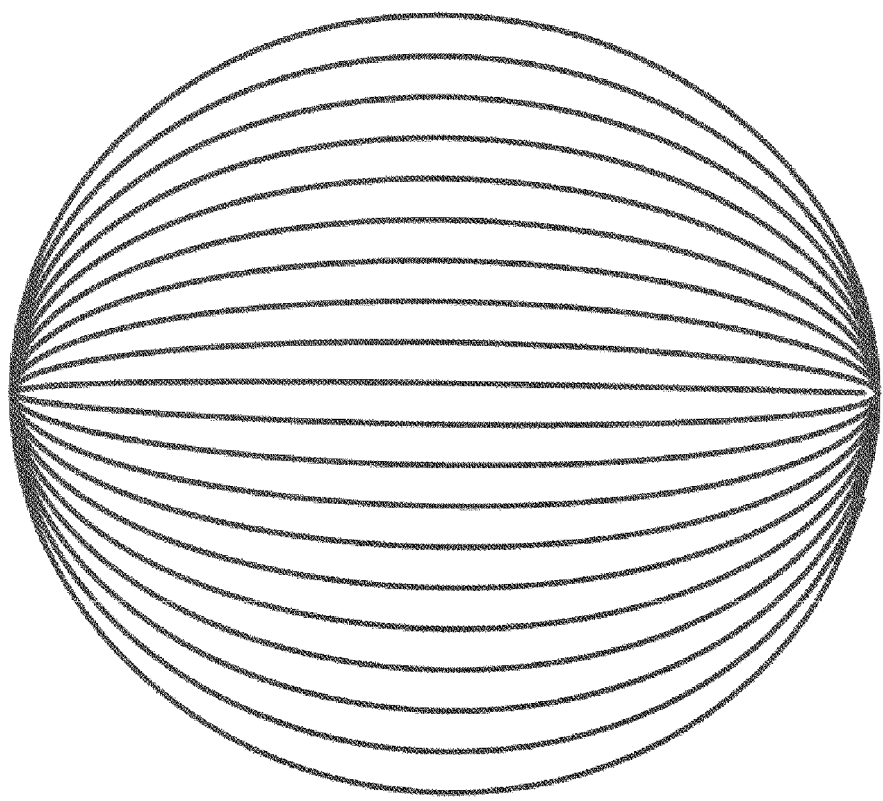
FIG. 8($a$) is a diagram showing optical scanning trajectories according to the first embodiment.
Figure 8B:
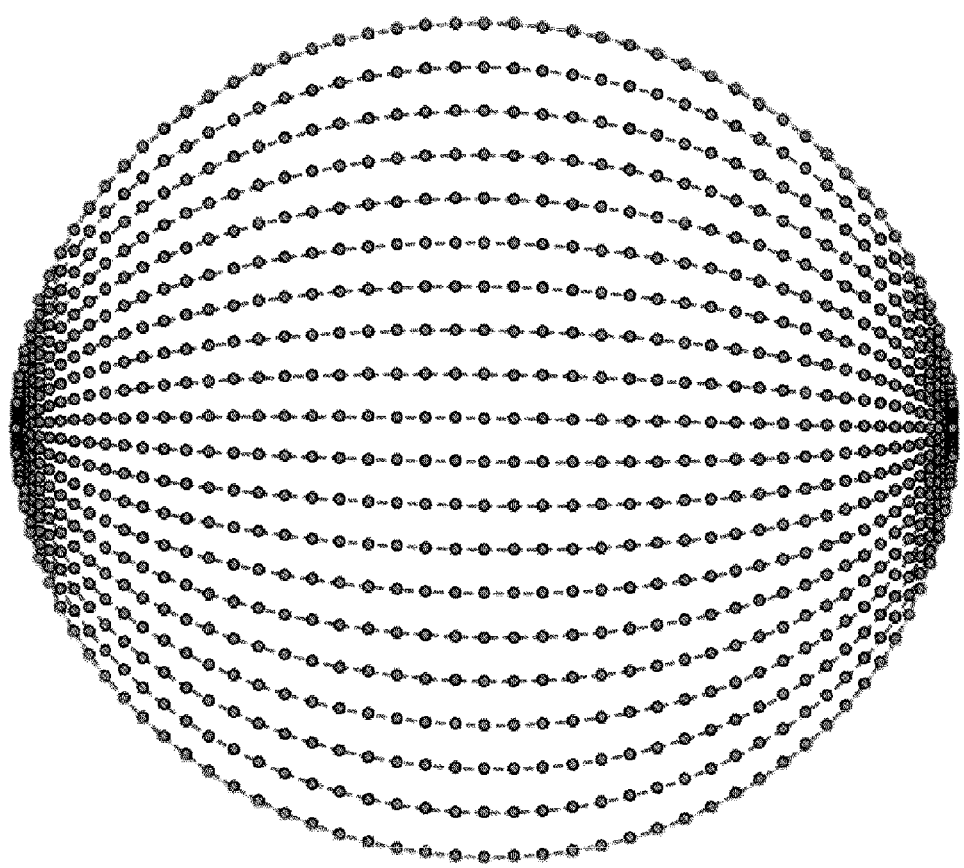

At this time, a timing at which the light source unit 1002 is modulated on the scanning trajectory of FIG. 8(a) is shown in FIG. 8(b). The timing at which the light source unit 1002 is modulated is shown as a light source modulation point. At the light source modulation point, brightness and color of the light source can be changed. Therefore, the more light source modulation points, the higher a resolution of a displayed video.

In the trajectory in FIG. 8(b), in the vertical direction (y-axis direction), light source modulation points can be arranged to be proportional to the number of rotations of the scanning trajectory. In order to increase the resolution, it is necessary to increase the number of rotations of the trajectory. Since the number of rotations of the trajectory is determined by a quotient obtained by dividing the vibration period Tv by the resonance cycle Tr, the y-axis direction resolution can be increased by increasing the resonance frequency fr.

On the other hand, in the horizontal direction (x-axis direction), as shown in Formula 10, $$\begin{pmatrix} \text{LIGHT SOURCE} \\ \text{MODULATION} \\ \text{POINTS OF } x\text{-AXIS} \end{pmatrix} \approx \frac{T_r}{2T_L} \quad \text{(Formula 10)}$$

the light source modulation points can be arranged only by the number of points determined by the resonance cycle Tr and the light source modulation cycle $T_L$.

That is, the light source modulation point in the x-axis direction can be increased by shortening the light source modulation cycle $T_L$ and performing high-speed modulation without changing the resonance frequency fr, and the resolution can be increased.

Generally, a modulation frequency $f_L$ of the light source can be about several tens of MHz, and the resonance frequency fr can be about several kHz to several tens of kHz which is value different from the value of $f_L$ by about 2 to 4 digits.

Therefore, the light source modulation cycle $T_L$ is smaller than the resonance cycle Tr by about 2 to 4 digits, and 1000 or more light source modulation points can be arranged in the x-axis direction.

Figure 9A:
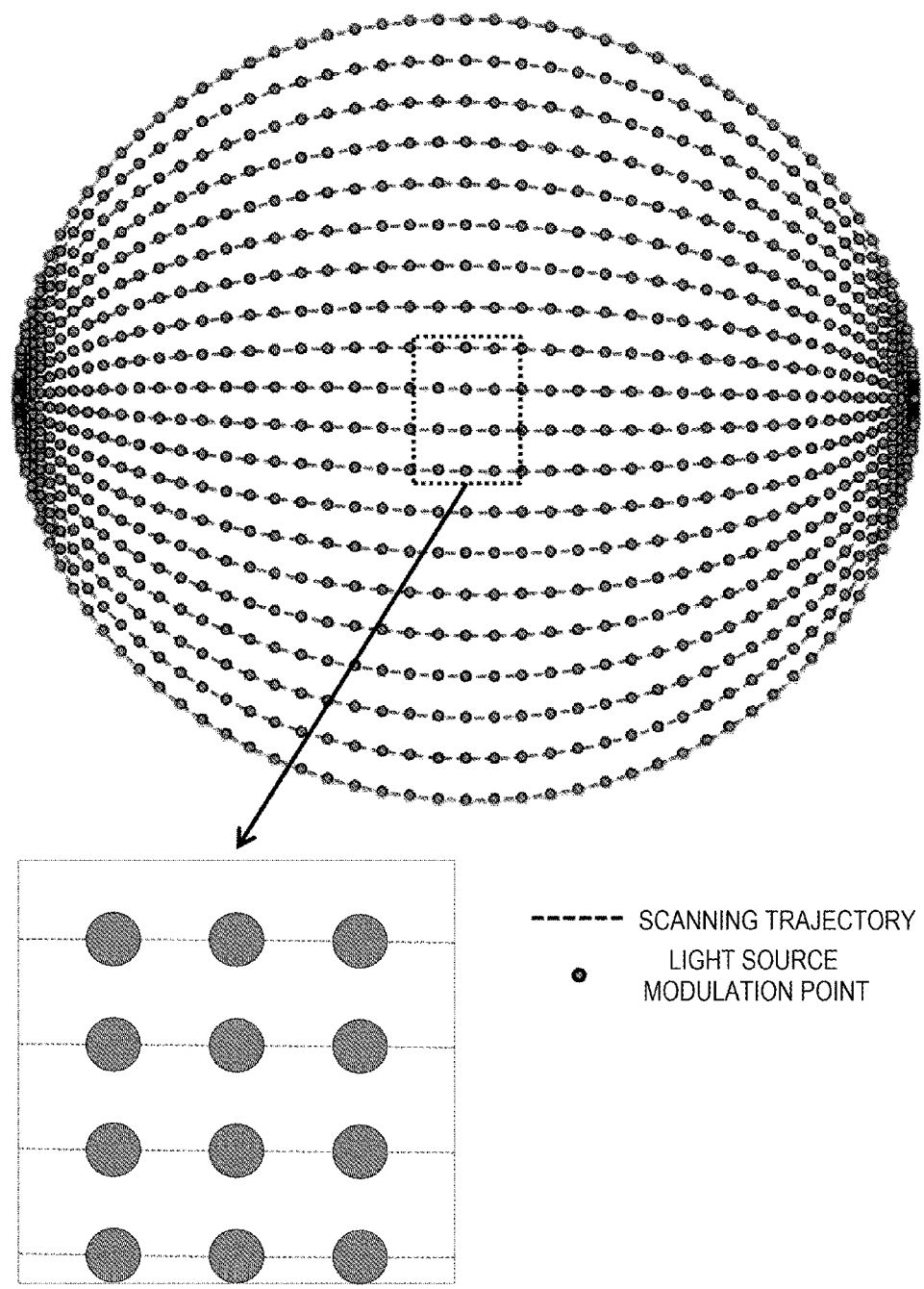
FIG. 9($a$) is a diagram showing distributions of the optical scanning trajectories and the light source modulation points according to the first embodiment.
Figure 9B:
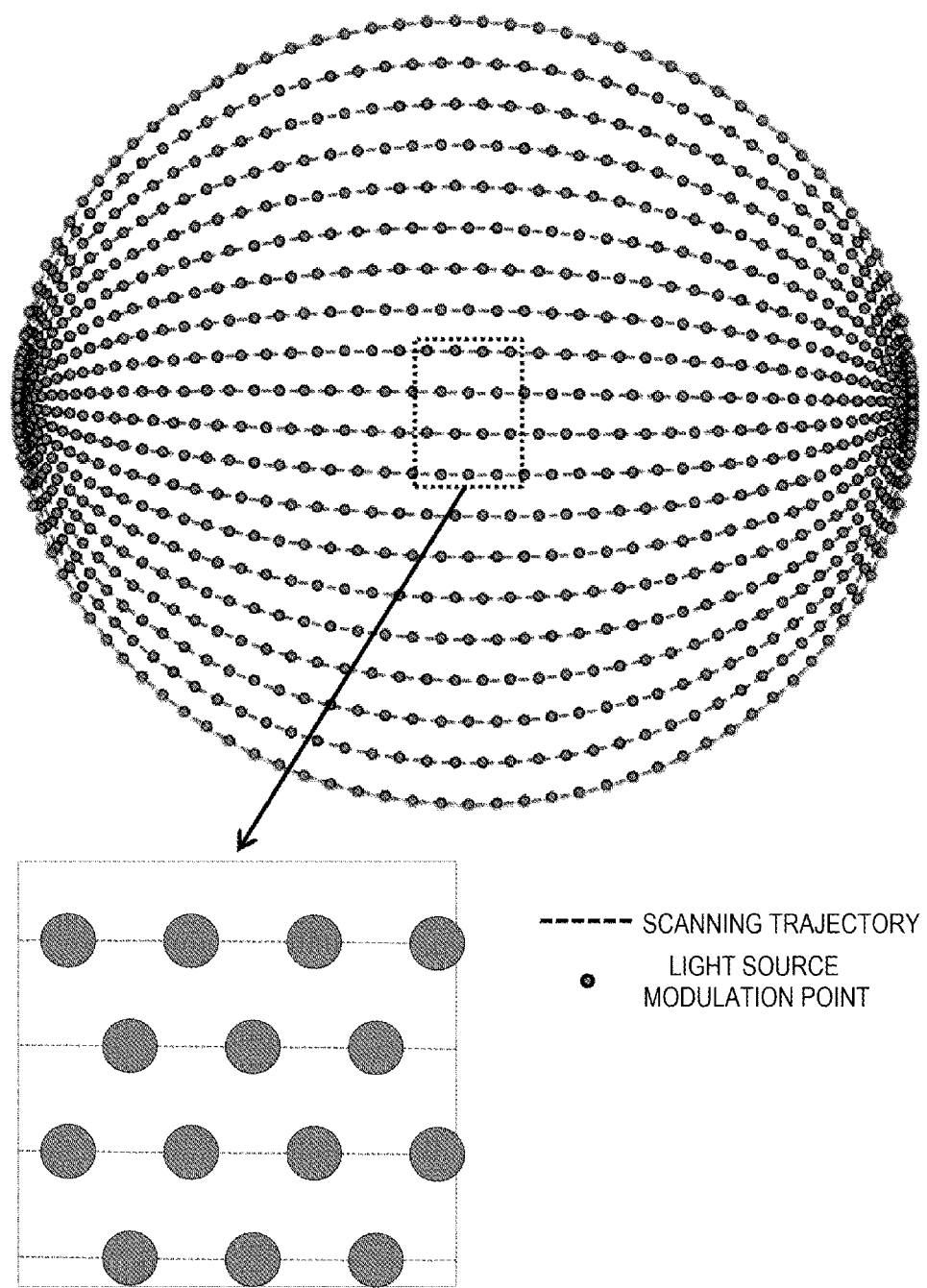

At this time, by setting Tr to be an integer multiple of $T_L$, the positions of the light source modulation points in the x-axis direction can be aligned as shown in FIG. 9(b). Since common video data is a set of V pieces of pixel data in the vertical direction and H pieces of pixel data in the horizontal direction, it is better to align the positions in the x-axis direction in this way.

When Tr is set to a sum of an integer multiple of $T_L$ and a half of $T_L$, as shown in FIG. 9(b), the light source modulation points are shifted by half a cycle and aligned every time the trajectory goes to the outer periphery. Since the laser spot is usually circular, in the case of the alignment of points as shown in FIG. 9(b), it is easy to maintain uniformity of in-plane brightness.

Figure 8C:
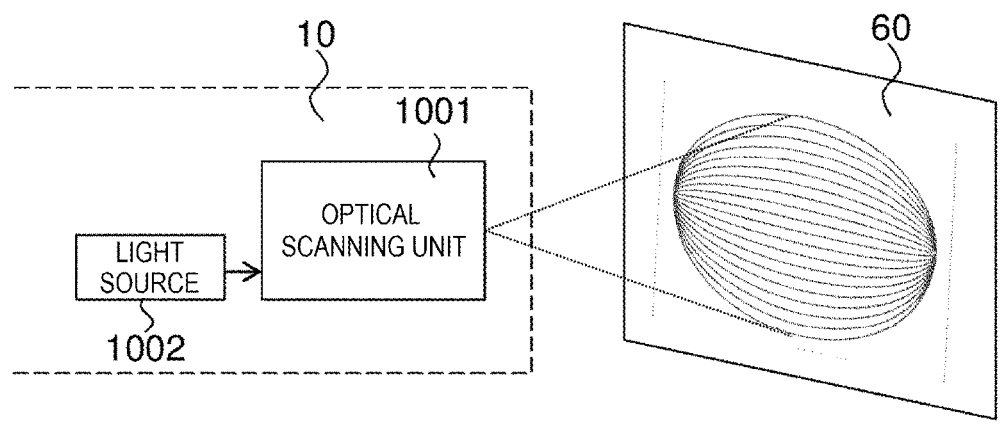

The scanning trajectory control unit 1007 generates the drive signal as described above. The drive signal generation unit 1008 converts the drive signal into an analog signal, and the drive signal amplified by the drive control unit 1009 is applied to the optical scanning unit 1001. For example, Vy1, Vy2, Vx1, and Vx2 are signals shown in FIG. 7(a). By such optical scanning, the trajectory shown in FIG. 8(a) is generated on a screen 60 as shown in FIG. 8(c).

The vibration unit 101 applicable to the driving method is not limited to the piezoelectric element, and any structure that can vibrate in the vertical direction and the horizontal direction is applicable. In addition, a shape of the piezoelectric element is also not limited to cylindrical, and other shapes such as a rectangular tube shape as shown in FIG. 14 are applicable.

Figure 10B:
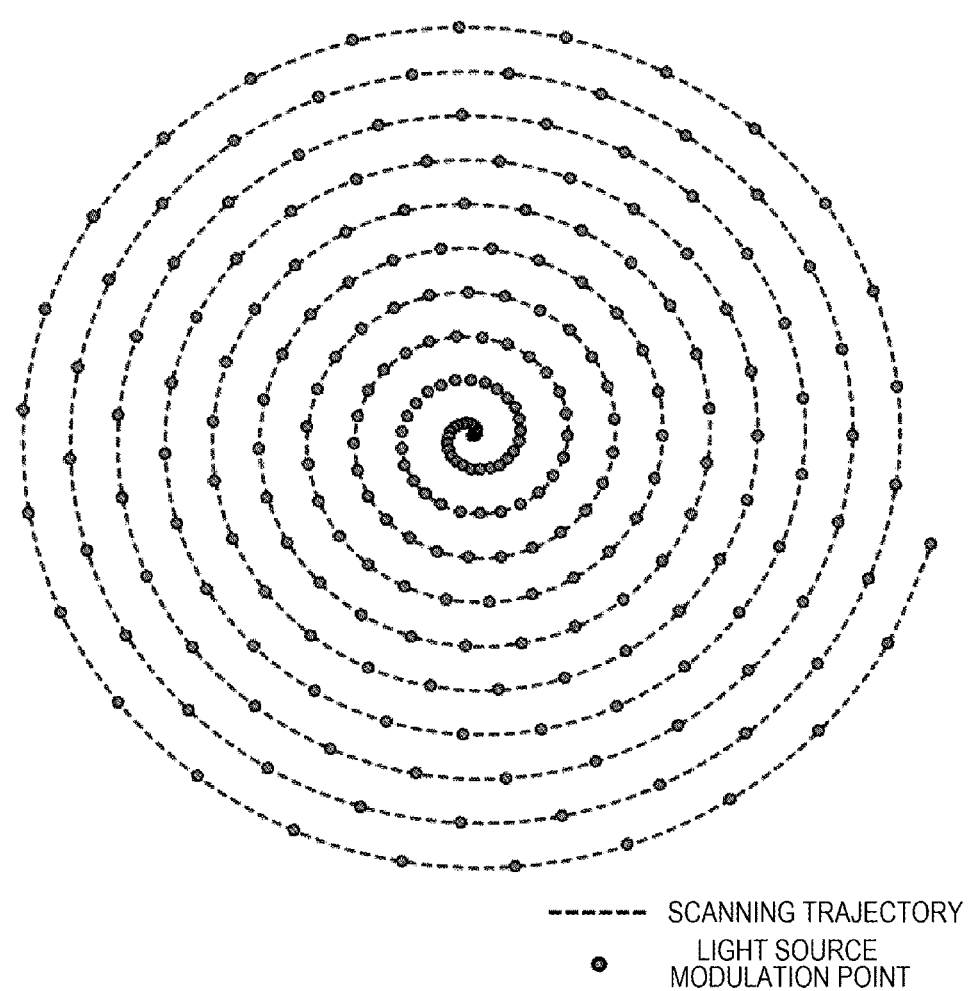

When the light source is modulated with the constant period TL in the spiral trajectory shown in FIG. 10(a), a distribution of the light source modulation points is shown in FIG. 10(b). Therefore, the resolution in the trajectory in FIG. 10(b) is the same value determined only by the number of rotations of the spiral in both the y-axis direction and the x-axis direction. In addition, since a linear velocity of optical scanning is slow at a center portion of the spiral, the difference in brightness from the outer peripheral portion becomes large.

According to the present embodiment, the resolution in the x-axis direction can be increased by the light source modulation cycle $T_L$ independent of the resonance frequency fr. Since a common video format has a rectangular aspect ratio such as 16:9 or 4:3, the resolution can be increased without changing the structure of the optical scanning unit 1001 by increasing the resolution in the x-axis direction regardless of the resonance frequency fr.

The video device 10 can continuously project video by repeatedly performing the above optical scanning. When the video device 10 performs optical scanning Nf times (Nf is a positive number) during one second, if the video signal stored in the video information storage unit 1006 is changed for each optical scanning, a moving image with a frame rate of Nf frames per second (fps) can be displayed.

When optical scanning is repeated in this way, this can be dealt with by replacing the time t in Formula 1 to Formula 8 with a remainder (the remainder of t by Tf) obtained by dividing the time t by the time required for one frame Tf=1/Nf.

FIG. 11 shows a timing chart of moving image display. The same operation of a y-axis displacement and an x-axis displacement as in FIG. 7(a) is repeated for each frame. The decay period Td is provided between frames for returning the optical scanning position in the y-axis direction to the center. During the decay period Td, the amplitude of the drive signal is decayed such that the vibration of the vibration unit 101 is stopped. In order to stop the vibration of the vibration unit 101, a signal having the frequency fr having a phase that is 180° different from that of the drive signal applied in the vibration period Tv may be applied.

During the vibration period Tv, the light emission control unit 1004 controls the light source 1002 to turn on the laser light. During the decay period Td, the light emission control unit 1004 turns off the light source 1002.

Video information stored in the video information storage unit 1006 referred to by the video control unit 1005 is updated every time Tf. The update of the video information is processed during the light turn-off period Td.

By extending a scanning range only in the x-axis direction as shown in FIG. 13 and emitting light from the light source 1002 only when the scanning position is within a predetermined effective range 130, it is possible to display a video with a rectangular aspect ratio as the common video format.

An expansion of the scanning range is set to $A_1 < A_2$ in Formula 5 and Formula 6, which may be optically expanded to one side by a lens or the like.

With a display method as shown in FIG. 13, no light is emitted in left and right portions of the trajectory where the light source modulation points are concentrated, so that a difference in brightness between the center portion and the peripheral portion is reduced. As in the case of the spiral scanning trajectory shown in FIG. 10(b), the problem that the difference in brightness between the center portion and the outer peripheral portion becomes large is solved.

Second Embodiment

Another embodiment of the invention will be described with reference to FIG. 15.

A video device 20 includes the optical scanning unit 1001, the light source unit 1002, the light source control unit 1003, the light emission control unit 1004, the video control unit 1005, the video information storage unit 1006, the scanning trajectory control unit 1007, the drive signal generation unit 1008, the drive control unit 1009, the device control unit 1010, the storage unit 1011, the input/output control unit 1012, and a frame counter 1501.

In FIG. 15, the components other than the scanning trajectory control unit 1007 and the frame counter 1501 are the similar to those in the first embodiment, and thus the description thereof is omitted.

The scanning trajectory control unit 1007 and the frame counter 1501 are implemented as digital circuits as an example, and may exist as functional blocks in an integrated circuit of, for example, the FPGA or the ASIC, which has the same IC as the light emission control unit 1004 and the video control unit 1005.

Similar to the first embodiment, the scanning trajectory control unit 1007 generates the drive signals expressed by Formula 5 and Formula 6. In the present embodiment, the amplitude A1 of the y-axis drive signal and the amplitude A2 of the x-axis drive signal are gradually increased with time, and during the decay period Td, the amplitudes $A_1$ and $A_2$ are decayed with time or become 0. That is, in Formula 7 and Formula 8, $a_1=a_2$ and $b_1=b_2=0$.

In the present embodiment, the frame counter 1501 has a function of counting the number of video frames. When a count of the number of frames is Fnum, the following formula is given with respect to, for example, the time t.

$$F_{num} = \left( \text{INTEGER PART OF } \frac{t}{T_f} \right) + 1 \quad \text{(Formula 11)}$$

The scanning trajectory control unit 1007 is characterized in that the trajectory of the optical scanning is changed by changing the drive signal depending on whether the count of the number of frames Fnum obtained by the frame counter 1501 is odd or even.

That is, in Formula 5 and Formula 6, $\phi_1$ and $\phi_2$ are controlled as follows.

$$\begin{cases} \varphi_1 = 0, \varphi_2 = 90° \ (F_{num} \text{ IS ODD}) \\ \varphi_1 = 180°, \varphi_2 = 270° \ (F_{num} \text{ IS EVEN}) \end{cases} \quad \text{(Formula 12)}$$

Figure 17A:
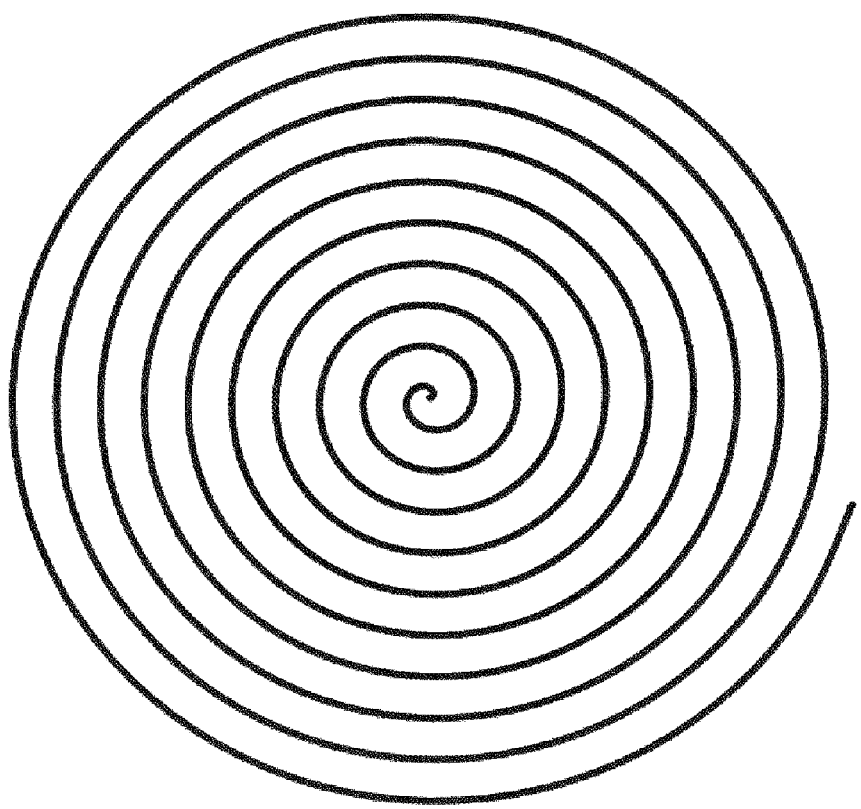
FIG. 17($a$) is a diagram showing an optical scanning trajectory of a pattern A according to the second embodiment.
Figure 17B:
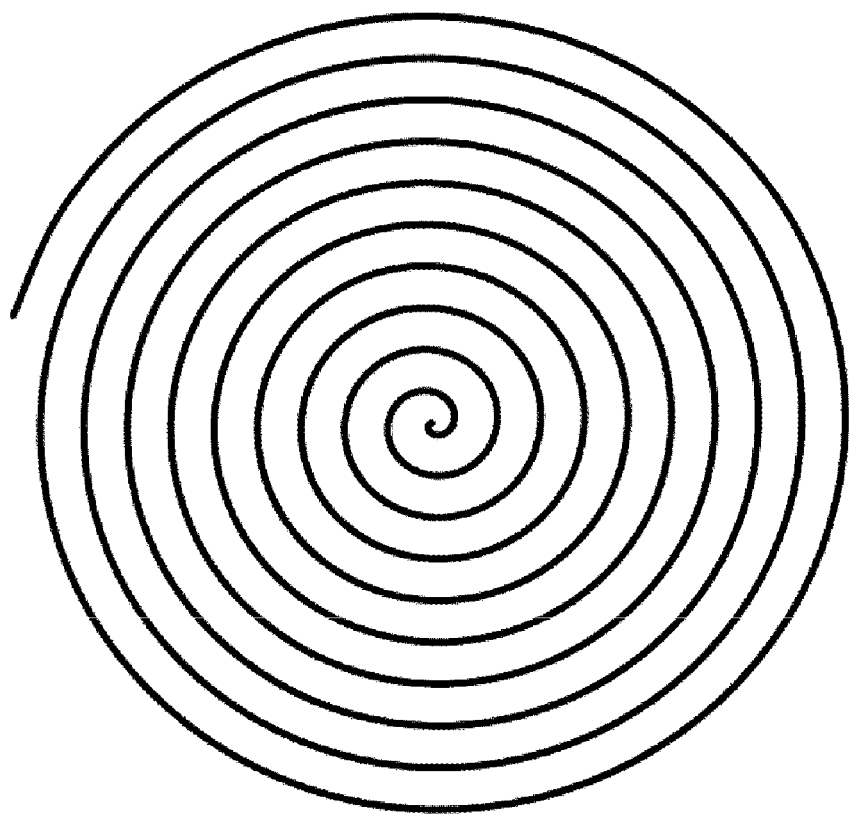

By controlling in this way, the drive signal becomes the signal shown in FIG. 16. For odd-numbered frames, the optical scanning is performed along a trajectory of a pattern A shown in FIG. 17(a). For even-numbered frames, the optical scanning is performed along a trajectory of a pattern B shown in FIG. 17(b). The trajectory of the pattern B is a figure obtained by rotating the trajectory of the pattern A by 180° with respect to the center of the spiral.

After a drive signal of the pattern A, scanning is performed with a drive signal of the pattern B having a reversed phase of which the x-axis and y-axis are inverted by 180°, whereby the next drive can be performed while canceling a vibration component excited by the pattern A.

Therefore, the optical scanning position that has moved to an outer periphery of the trajectory of the pattern A can be quickly returned to the center position of the spiral, and the decay period Td can be reduced. When the decay period Td is reduced, the one frame required time Tf can be reduced without changing the vibration period Tv and the resonance cycle Tr, so that the frame rate Nf can be increased.

Alternatively, when the frame rate Nf and the resonance cycle Tr are constant, if the decay period Td is reduced, the vibration period Tv can be increased, and the number of rotations of the trajectory and resolution can be increased.

When the trajectory of the pattern A and the trajectory of the pattern B are superimposed on the same plane, the result is as shown in FIG. 18. The trajectory of the pattern B passes between the trajectories of the pattern A. By using this to draw another pixel of the same image with the trajectory of the pattern A and the trajectory of the pattern B like an interlaced video, a method of drawing a higher resolution video may be used.

In addition, as shown in FIG. 19, a drive pulse whose phase is inverted in the decay period Td is applied as a brake pulse, and the decay period Td is further reduced.

In this case, the drive signals in the decay period Td of the odd-numbered frames and the vibration period Tv of the even-numbered frames are in-phase sine wave signals. Similarly, the drive signals in the decay period Td of the even-numbered frames and the vibration period Tv of the odd-numbered frames are in-phase signals.

In addition, as a modification of the present embodiment, the operation may be performed as shown in a timing chart of FIG. 20. In the present modification, the vibration amount at the optical scanning position of the y-axis and the x-axis during the decay period Td is gently decayed. For example, the vibration amplitude is reduced by a decay amount having a gradient opposite to an amount of increase of the displacement during the vibration period Tv. In Formula 7 and Formula 8, coefficients are changed as in the following formulas.

$$\begin{cases} a_1 = A_y > 0, a_2 = A_x > 0 \text{ (VIBRATION PERIOD } T_v\text{)} \\ a_1 \approx -A_y, a_2 \approx -A_x \text{ (DECAY PERIOD } T_d\text{)} \end{cases} \quad \text{(Formula 13)}$$

Based on Formula 12 and Formula 13, the drive signal is generated in FIG. 20.

Third Embodiment

A third embodiment of the invention will be described with reference to FIG. 15. The configuration of the video device 20 of the present embodiment is similar to that of the second embodiment.

Similar to the first embodiment, the scanning trajectory control unit 1007 generates the drive signals expressed by Formula 5 and Formula 6. In the present embodiment, the amplitude A1 of the y-axis drive signal is gradually increased with time, and during the decay period Td, the amplitude $A_1$ is decayed with time or becomes 0. The other amplitude $A_2$ of x-axis drive signal is set to a substantially constant value.

The scanning trajectory control unit 1007 is characterized in that the trajectory of the optical scanning is changed by changing only the y-axis drive signal depending on whether the count of the number of frames Fnum obtained by the frame counter 1501 is odd or even.

That is, in Formula 5 and Formula 6, $\phi_1$ and $\phi_2$ are controlled as follows.

$$\begin{cases} \varphi_1 = 0, \varphi_2 = 90° \ (F_{num} \text{ IS ODD}) \\ \varphi_1 = 180°, \varphi_2 = 90° \ (F_{num} \text{ IS EVEN}) \end{cases} \quad \text{(Formula 14)}$$

By controlling in this way, the drive signal becomes the signal shown in FIG. 21. The trajectory at this time is shown in FIG. 22. For odd-numbered frames, the optical scanning is performed along a trajectory of the pattern A shown by a solid line in 22. For even-numbered frames, the optical scanning is performed along a trajectory of the pattern B shown by a broken line in FIG. 22. The trajectory of the pattern B is a trajectory obtained by inverting the trajectory of the pattern A in the y-axis direction.

According to the control in the present embodiment, the resolution in the x-axis direction can be increased by the light source modulation cycle $T_L$ independent of the resonance frequency fr. Since a common video format has a rectangular aspect ratio such as 16:9 or 4:3, the resolution can be increased without changing the structure of the optical scanning unit 1001 by increasing the resolution in the x-axis direction regardless of the resonance frequency fr.

In the y-axis direction scanning, the optical scanning position that has moved to the outer periphery of the trajectory of the pattern A can be quickly returned to the center position in the y-axis direction, and the decay period Td can be reduced. When the decay period Td is reduced, the one frame required time Tf can be reduced without changing the vibration period Tv and the resonance cycle Tr, so that the frame rate Nf can be increased. Alternatively, when the frame rate Nf and the resonance cycle Tr are constant, if the decay period Td is reduced, the vibration period Tv can be increased, and the number of rotations of the trajectory and the resolution can be increased.

In the present embodiment, similar to the second embodiment, by drawing different pixels of the same image with the trajectory of the pattern A and the trajectory of the pattern B like the interlaced video using the trajectory of the pattern A and the trajectory of the pattern B, a method of drawing a higher resolution video may be used.

In addition, as a modification of the present embodiment, the operation may be performed as shown in a timing chart of FIG. 23. In the present modification, the vibration amount at the optical scanning position of the y-axis during the decay period Td is gently decayed. For example, the vibration amplitude is reduced by the decay amount having the gradient opposite to the amount of increase of the displacement during the vibration period Tv. In Formula 7, coefficients are changed as in the following formulas.

$$\begin{cases} a_1 = A_y > 0 \text{ (VIBRATION PERIOD } T_v\text{)} \\ a_1 \approx -A_y < 0 \text{ (DECAY PERIOD } T_d\text{)} \end{cases} \quad \text{(Formula 15)}$$

Based on Formula 14 and Formula 15, the drive signal is generated in FIG. 23.

Fourth Embodiment

A fourth embodiment of the invention will be described with reference to FIG. 1. The configuration of the video device 10 of the present embodiment is similar to that of the first embodiment.

In FIG. 1, the components other than the scanning trajectory control unit 1007 are similar to those in the first embodiment, and thus the description thereof is omitted.

The scanning trajectory control unit 1007 is implemented as a digital circuit as an example, and may exist as a functional block in an integrated circuit of, for example, the FPGA or the ASIC, which has the same IC as the light emission control unit 1004 and the video control unit 1005.

Similar to the first embodiment, the scanning trajectory control unit 1007 generates the drive signals expressed by Formula 5 and Formula 6.

In the present embodiment, the coefficients in Formula 7 and Formula 8 are modulated so as to satisfy the following relationship.

$$\begin{cases} a_1 = A_y < 0, a_2 = A_x > 0 \\ b_1 = B_y, b_2 = B_x \end{cases} \quad \text{(Formula 16)}$$

Figure 25A:
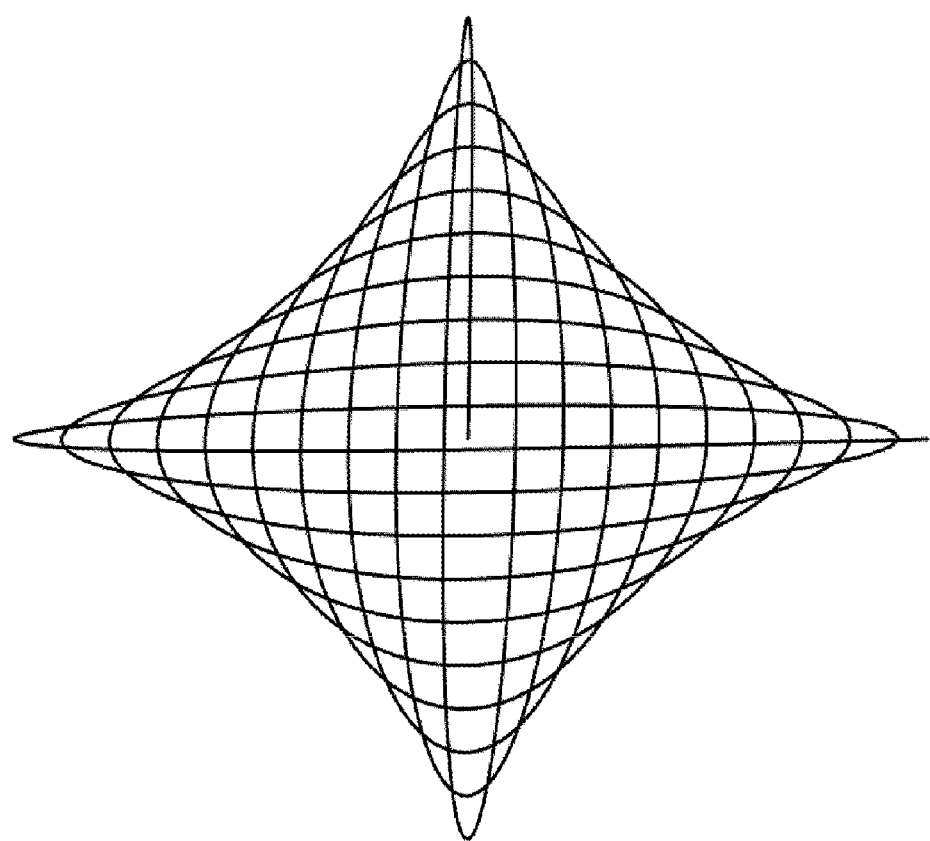
FIG. 25($a$) is a diagram showing optical scanning trajectories according to the fourth embodiment.

That is, modulation is performed such that, in the x-axis drive signal and the y-axis drive signal that are substantially orthogonal, when one of amplitudes of sine waves of the drive signal increases, the other decreases (increase/decrease in an envelope). By controlling in this way, the drive signal becomes the signal shown in FIG. 24. The trajectory at this time is shown in FIG. 25(a).

Figure 25B:
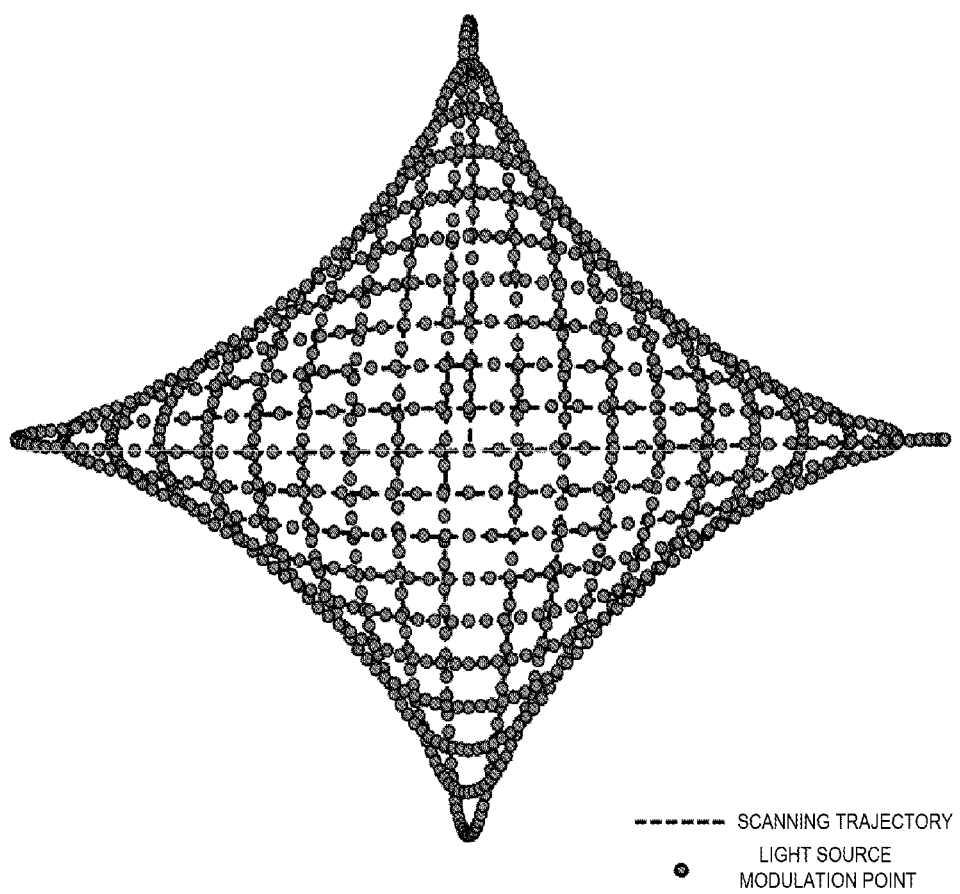

Similar to the first embodiment, the light source 1002 is modulated with the modulation cycle $T_L$ that is sufficiently shorter than the resonance cycle Tr, thereby obtaining a distribution of the light source modulation points shown in FIG. 25(b).

Figure 26A:
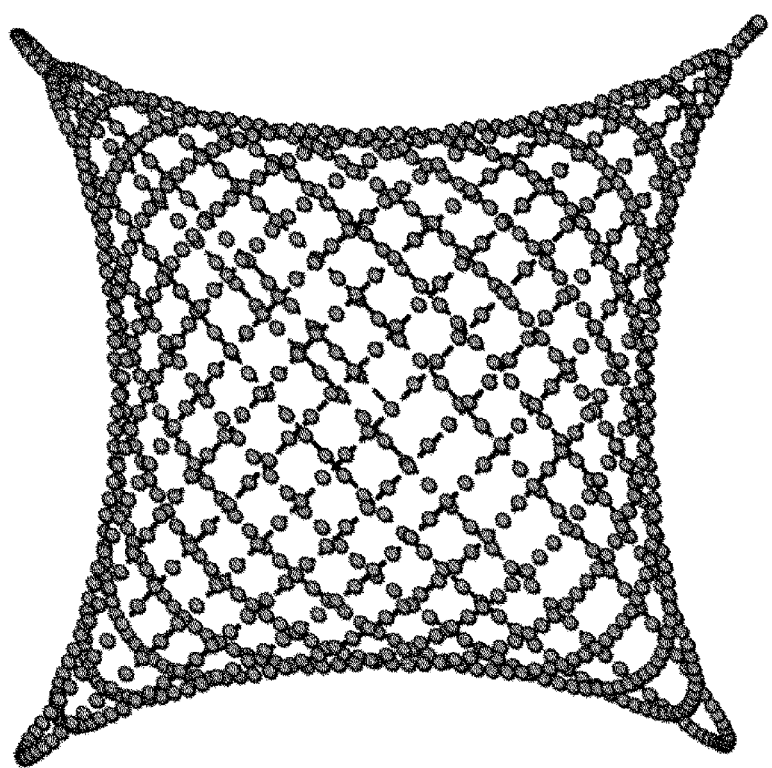
FIG. 26($a$) is a diagram showing distributions of the optical scanning trajectories and light source modulation points according to the fourth embodiment.
Figure 26B:
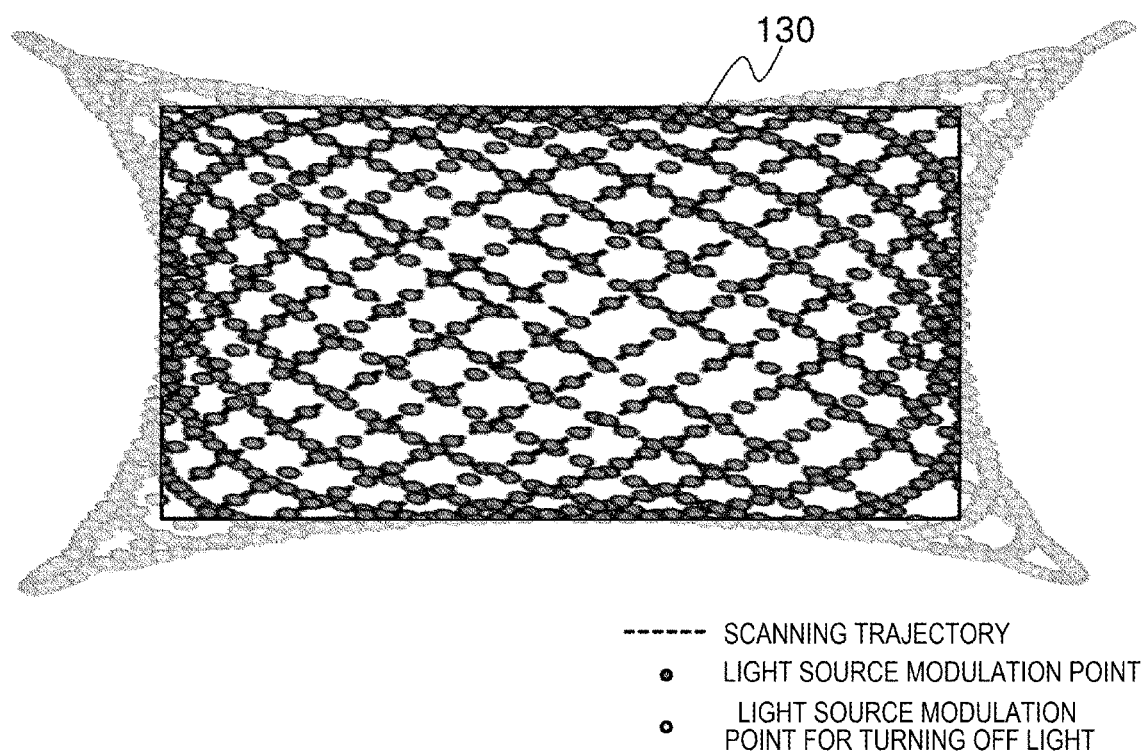

When the distribution of the light source modulation points in FIG. 25(b) is inclined 45° obliquely, a trajectory close to a rectangle as shown in FIG. 26(a) is obtained. The trajectory is expanded in the horizontal direction as shown in FIG. 26(b), and the light source 1002 emits light only when the scanning position is within the predetermined effective range 130, so that video display can be performed with a rectangular aspect ratio as in the common video format. The scanning range can be expanded optically by a lens or the like.

In the present embodiment, since the number of light source modulation points during light turning-off can be reduced, the brightness displayed within the effective range 130 is increased, as compared with the first embodiment as shown in FIG. 13.

In addition, as a modification of the present embodiment, the operation may be performed as shown in a timing chart of FIG. 27. In the present modification, the operation can be implemented by changing coefficients in Formula 7 and Formula 8 as in the following formulas.

$$\begin{cases} a_1 = A_y < 0, a_2 = A_x > 0 \text{ (VIBRATION PERIOD } T_v) \\ a_1 \approx -A_y > 0, a_2 \approx -A_x < 0 \text{ (DECAY PERIOD } T_d) \\ b_1 = B_y, b_2 = B_x \end{cases} \quad \text{(Formula 17)}$$

In the present embodiment, $A_1$ and $A_2$ are not limited to linear functions of time t as shown in Formula 7 and Formula 8. When $A_1$ and $A_2$ are functions such as a square root of time t, it can be expected that the distribution of the light source modulation points becomes closer to a rectangle.

Fifth Embodiment

A fifth embodiment of the invention will be described with reference to FIG. 1. The configuration of the video device 10 of the present embodiment is similar to that of the first embodiment.

In FIG. 1, the components other than the scanning trajectory control unit 1007 are similar to those in the first embodiment, and thus the description thereof is omitted.

The scanning trajectory control unit 1007 is implemented as a digital circuit as an example, and may exist as a functional block in an integrated circuit of, for example, the FPGA or the ASIC, which has the same IC as the light emission control unit 1004 and the video control unit 1005.

Similar to the first embodiment, the scanning trajectory control unit 1007 generates the drive signals expressed by Formula 5 and Formula 6.

In the present embodiment, the coefficients in Formula 7 and Formula 8 are modulated so as to satisfy the following relationship.

$$\begin{cases} a_1 = A_y < 0 \text{ (WHEN } A_1(t) \geq A_{1max}, A_1(t) = A_{1max}) \\ a_2 = A_x > 0 \text{ (WHEN } A_2(t) \geq A_{2max}, A_2(t) = A_{2max}) \\ b_1 = B_y, b_2 = B_x \end{cases} \quad \text{(Formula 18)}$$

Figure 29A:
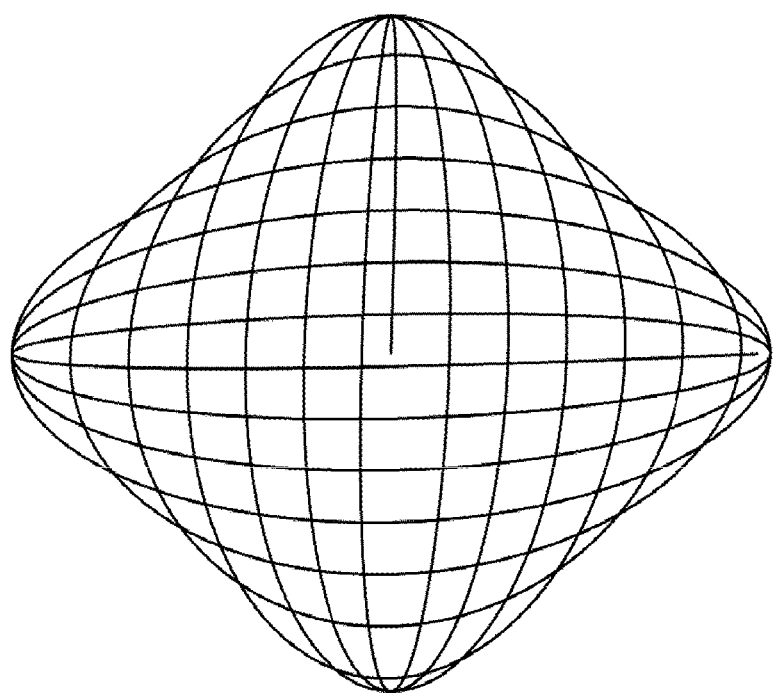
FIG. 29($a$) is a diagram showing optical scanning trajectories according to the fifth embodiment.

That is, similar to the fourth embodiment, modulation is performed so as to satisfy relationship that, in the x-axis drive signal and the y-axis drive signal that are substantially orthogonal, when one of amplitudes of sine waves of the drive signal increases, the other decreases (increase/decrease in an envelope). Any maximum value is set as amplitude of the drive signal, and modulation is performed such that the amplitude of the sine wave does not exceed the maximum value. By controlling in this way, the drive signal becomes the signal shown in FIG. 28. The trajectory at this time is shown in FIG. 29(a).

Figure 29B:
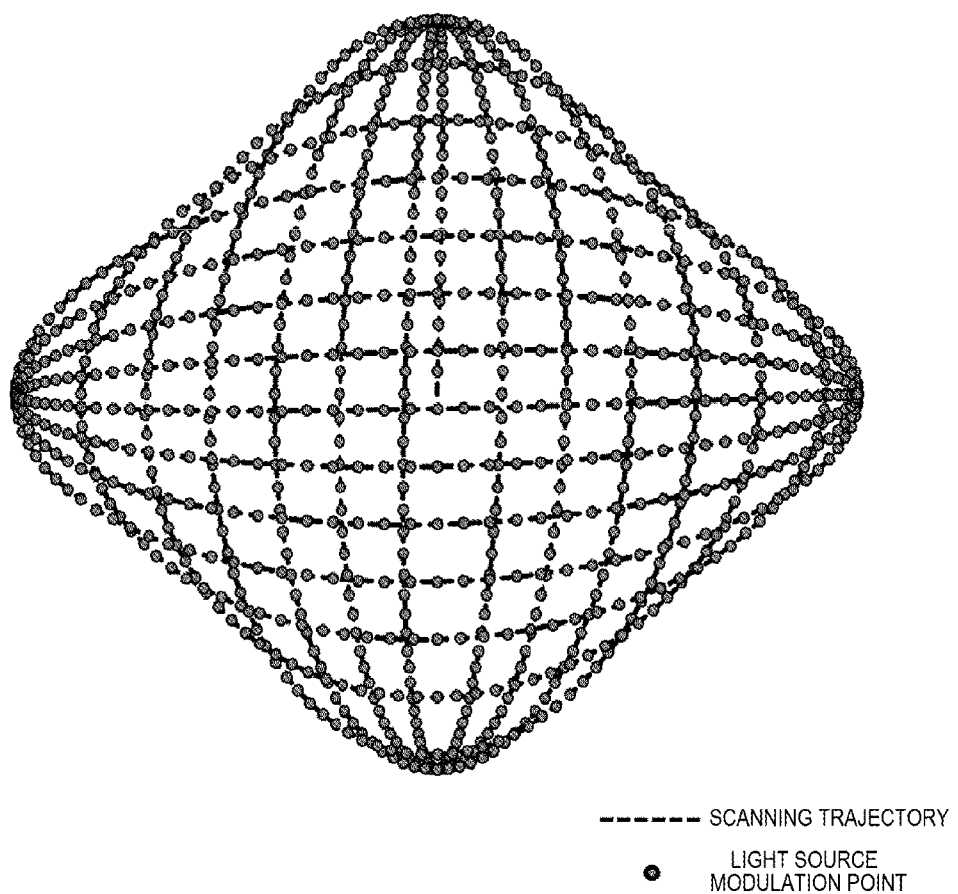

Similar to the first embodiment, the light source 1002 is modulated with the modulation cycle $T_L$ that is sufficiently shorter than the resonance cycle Tr, thereby obtaining a distribution of the light source modulation points shown in FIG. 29(b).

Figure 30A:
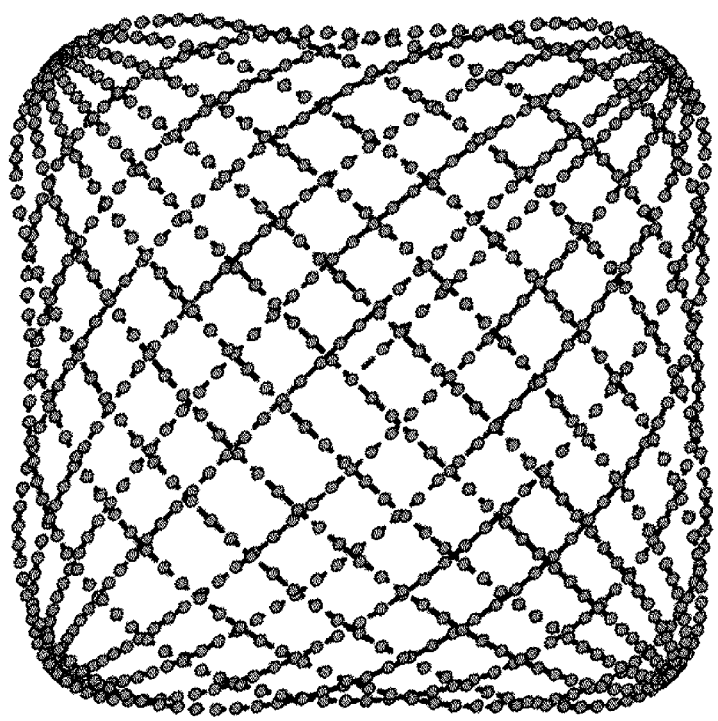
FIG. 30($a$) is a diagram showing distributions of the optical scanning trajectories and light source modulation points according to the fifth embodiment.
Figure 30B:
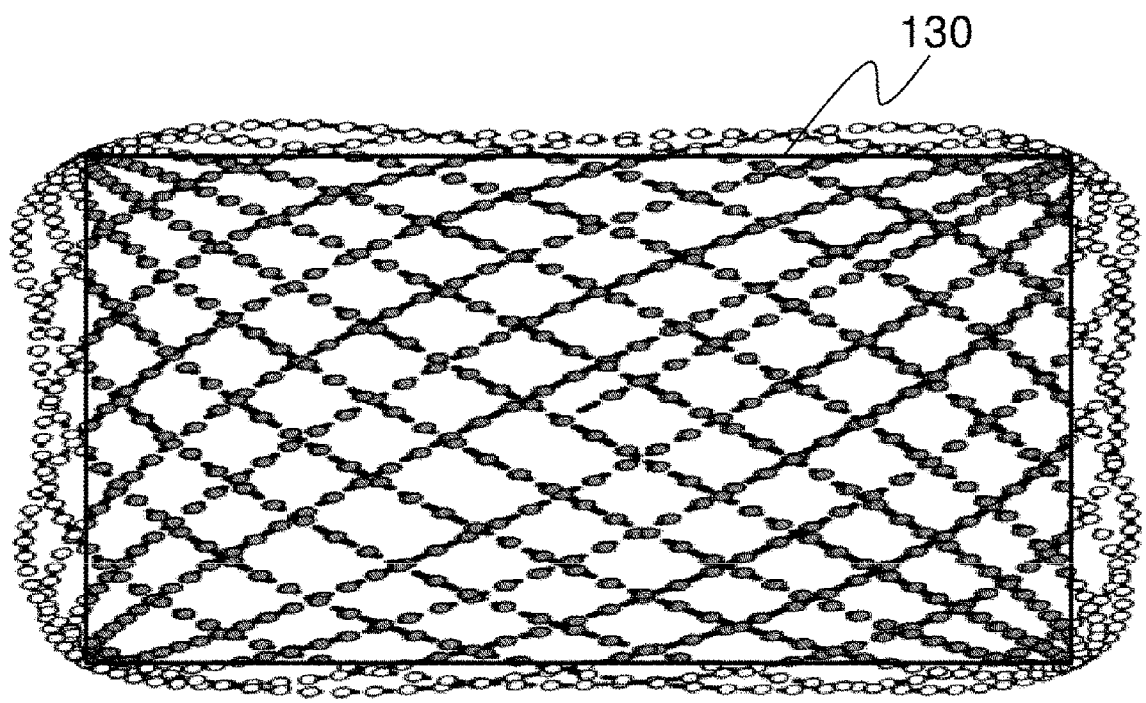

When the distribution of the light source modulation points in FIG. 29(b) is inclined 45° obliquely, a trajectory close to a rectangle as shown in FIG. 30(a) is obtained. The trajectory is expanded in the horizontal direction as shown in FIG. 30(b), and the light source 1002 emits light only when the scanning position is within the predetermined effective range 130, so that video display can be performed with a rectangular aspect ratio as in the common video format. The scanning range can be expanded optically by a lens or the like.

In the present embodiment, since the optical scanning range can be close to a rectangle, the number of light source modulation points during light turning-off can be reduced, and the brightness displayed within the effective range 130 is increased, as compared with the fourth embodiment as shown in FIG. 26.

In addition, as a modification of the present embodiment, the operation may be performed as shown in a timing chart of FIG. 31.

In the present modification, the operation can be implemented by changing coefficients in Formula 7 and Formula 8 as in the following formulas.

$$\begin{cases} a_1 = A_y < 0 \text{ (WHEN } A_1(t) \geq A_{1max}, A_1(t) = A_{1max}) \\ a_2 = A_x > 0 \text{ (WHEN } A_2(t) \geq A_{2max}, A_2(t) = A_{2max}) \\ \quad \text{(VIBRATION PERIOD } T_v) \\ a_1 \approx -A_y > 0 \text{ (WHEN } A_1(t) \geq A_{1max}, A_1(t) = A_{1max}) \\ a_2 \approx -A_x < 0 \text{ (WHEN } A_2(t) \geq A_{2max}, A_2(t) = A_{2max}) \\ \quad \text{(DECAY PERIOD } T_d) \\ b_1 = B_y, b_2 = B_x \end{cases} \quad \text{(Formula 19)}$$

In the present embodiment, $A_1$ and $A_2$ are not limited to linear functions of time t as shown in Formula 7 and Formula 8. When $A_1$ and $A_2$ are functions such as a square root of time t, it can be expected that the distribution of the light source modulation points becomes closer to a rectangle.

Sixth Embodiment

Although the video device 10 and the video device 20 in each of the first to fifth embodiments have been described as a device having a function of projecting video, such as the projector or the head mounted display, the video device in the present embodiment can also be configured as an imaging device having a function of acquiring an image of a camera or a sensor.

An embodiment of the imaging device will be described with reference to FIG. 32.

A video device 30 includes the optical scanning unit 1001, the light source unit 1002, the light source control unit 1003, the light emission control unit 1004, the video control unit 1005, the video information storage unit 1006, the scanning trajectory control unit 1007, the drive signal generation unit 1008, the drive control unit 1009, the device control unit 1010, the storage unit 1011, the input/output control unit 1012, and a light receiving unit 1020.

In FIG. 32, components other than the light emission control unit 1004, the video control unit 1005, the video information storage unit 1006, and the light receiving unit 1020 are similar to those in the first embodiment, and thus the description thereof is omitted.

The light emission control unit 1004 and the video control unit 1005 are implemented as digital circuits as an example. The light emission control unit 1004, the video control unit 1005, and the scanning trajectory control unit 1007 may exist as functional blocks in an integrated circuit such as the same IC, for example, the FPGA or the ASIC.

The video device 30 in the present embodiment is connected to the external control device 50 via the input/output control unit 1012. The video device 30 in the present embodiment transmits a captured video signal to the external control device 50. The external control device 50 is, for example, a display device that displays video information or a recording device that stores video information.

The light emission control unit 1004 generates a signal for the light source 1002 to turn on light at a predetermined timing. The light emission control unit 1004 may correct timing and luminance based on information from the scanning trajectory control unit 1007.

The light receiving unit 1020 includes a light receiving element that converts light of a photodetector into an electric signal. In addition to the light receiving element, the light receiving unit 1020 may include a light guide path, an optical amplifier, an electric signal amplifier circuit, and an analog-digital conversion circuit. The light receiving unit 1020 generates light reception information corresponding to the received light. The light reception information is, for example, light reception intensity information corresponding to intensity of received light, or timing information when light reception intensity has changed. In the present embodiment, light reception intensity information will be described as an example.

As shown in FIG. 33, the video device 30 of the present embodiment that operates as an imaging device emits laser light output from the light source 1002 to the imaging object 70. The laser light emitted to the imaging object 70 is reflected or scattered by a surface of the imaging object 70, and a part of reflected light or scattered light is received by the light receiving unit 1020. A position at which the laser light is emitted onto the imaging object 70 by the optical scanning unit 1001 varies by optical scanning similar to the optical scanning described in each of the first to fifth embodiments.

The video control unit 1005 receives the synchronization signal from the scanning trajectory control unit 1007 and calculates coordinates (x, y) determined according to an optical scanning position. Further, the video control unit 1005 receives the light reception information from the light receiving unit 1020, and writes pixel data corresponding to the light reception information and the coordinates (x, y) into the video information storage unit 1006. The pixel data is, for example, gradation data corresponding to the received light intensity information.

The video information storage unit 1006 receives pixel data from the video information control unit 1005 and holds screen data including a plurality of pieces of pixel data.

The input/output control unit 1012 outputs the screen data held in the video information storage unit 1006 to the external control device 50 at a predetermined interval.

Accordingly, the video device 30 can transmit captured video information to the external control device.

The invention is not limited to the above-described embodiments, and includes various modifications. For example, the above-described embodiments have been described in detail for easy understanding of the invention, and are not necessarily limited to those having all the configurations described. In addition, a part of the configuration of one embodiment can be replaced with the configuration of another embodiment, and the configuration of another embodiment can be added to the configuration of one embodiment. In addition, it is possible to add, delete, and replace other configurations for a part of the configuration of each embodiment. Each of the above-described configurations, functions, processing units, processing methods, and the like may be implemented by hardware by designing a part or all of them with, for example, the integrated circuit.

REFERENCE SIGN LIST

10: video device of first, fourth, and fifth embodiments
20: video device of second and third embodiments
30: video device of sixth embodiment
50: external control device
60: screen
70: imaging object
101: vibration unit
102: light guide path
103: joint unit
104: lens
105: exterior unit
106: support member
107, 107-1, 107-2, 107-3, 107-4: electrical wiring unit
130: effective range of video display device
1001: optical scanning unit
1002: light source unit
1003: light source control unit
1004: light emission control unit
1005: video control unit
1006: video information storage unit
1007: scanning trajectory control unit
1008: drive signal generation unit
1009: drive control unit
1010: device control unit
1011: storage unit
1012: input/output control unit
1020: light receiving unit
1201: red LD
1202: green LD
1203: blue LD
1204, 1205, 1206: current limiting resistor
1501: frame counter
3010: piezoelectric medium
3011: first outer peripheral electrode
3012: second outer peripheral electrode
3013: third outer peripheral electrode
3014: fourth outer peripheral electrode
3015: inner peripheral electrode
3021: first piezoelectric element
3022: second piezoelectric element
3023: third piezoelectric element
3024: fourth piezoelectric element

The invention claimed is:

1. A video device comprising:

an optical scanning unit including a light guide path in which light enters from one end and emits from another end, and a vibration unit configured to apply vibration to the light guide path via a joint unit in a vicinity of the other end of the light guide path, wherein the vibration unit is configured to independently vibrate the light guide path in a first direction substantially perpendicular to an optical axis direction of the light guide path, and in a second direction substantially perpendicular to the optical axis direction of the light guide path and substantially perpendicular to the first direction;

a drive signal generation unit configured to generate drive signals for inducing vibration in the vibration unit;

a scanning trajectory control unit configured to determine a pattern of a first drive signal that drives the vibration unit in the first direction and a second drive signal that drives the vibration unit in the second direction, output information on the pattern of the first and second drive signals to the drive signal generation unit, and output a synchronization signal for optical scanning;

a video control unit configured to calculate optical scanning position coordinates based on the synchronization signal received from the scanning trajectory control unit, read pixel data corresponding to the optical scanning position coordinates from video information to be projected, and transmit the pixel data; and a light emission control unit configured to generate signals to modulate a light source unit according to the pixel data received from the video control unit;

wherein the light source unit is configured to inject light into the light guide path; and wherein the scanning trajectory control unit generates the first drive signal and the second drive signal as sine waves having 90° different phases and a substantially same frequency, gradually increases the amplitude of the second drive signal with time during a vibration period, decays the amplitude with time or sets the amplitude to zero during a decay period, and sets the amplitude of the first drive signal to an approximately constant value.

2. The video device according to claim 1, wherein a cycle in which the light emission control unit modulates the light source unit is sufficiently smaller by 2 to 4 digits enough to obtain a sufficient resolution in the first direction than a cycle of the sine wave of the first drive signal.

3. The video device according to claim 2, wherein the cycle of the sine wave of the first drive signal is an integer multiple of the cycle in which the light emission control unit modulates the light source unit.

4. The video device according to claim 2, wherein the cycle of the sine wave of the first drive signal is a sum of an integer multiple of the cycle in which the light emission control unit modulates the light source unit and a half of the cycle.

5. The video device according to claim 1, wherein a maximum modulation amplitude of the sine wave of the first drive signal is larger than a maximum modulation amplitude of the sine wave of the second drive signal, and optical scanning is performed on an elliptical area which effectively encompasses a rectangular aspect ratio video display area of a video format.

* * * * *